United States Patent
Quanci et al.

(10) Patent No.: US 12,370,599 B2
(45) Date of Patent: Jul. 29, 2025

(54) TREATING COOLING WATER IN IRON PRODUCTION FACILITIES, AND ASSOCIATED SYSTEMS, DEVICES, AND METHODS

(71) Applicant: SUNCOKE TECHNOLOGY AND DEVELOPMENT LLC, Lisle, IL (US)

(72) Inventors: John Francis Quanci, Haddonfield, NJ (US); John Michael Richardson, Devon, PA (US); Patrick James Mullarkey, Manhattan, IL (US); David James Schwake, Aurora, IL (US); Andrew Michael Butor, Cranberry Township, PA (US); Jonathan Hale Perkins, Lisle, IL (US); Chun Wai Choi, Lisle, IL (US)

(73) Assignee: SUNCOKE TECHNOLOGY AND DEVELOPMENT LLC, Lisle, IL (US)

( * ) Notice: Subject to any disclaimer, the term of this patent is extended or adjusted under 35 U.S.C. 154(b) by 0 days.

(21) Appl. No.: 18/882,384

(22) Filed: Sep. 11, 2024

(65) Prior Publication Data
US 2025/0083980 A1    Mar. 13, 2025

Related U.S. Application Data

(60) Provisional application No. 63/581,946, filed on Sep. 11, 2023.

(51) Int. Cl.
*B22F 1/05*     (2022.01)
*B22D 41/12*    (2006.01)
(Continued)

(52) U.S. Cl.
CPC .............. *B22F 1/05* (2022.01); *B22D 41/12* (2013.01); *B22F 9/04* (2013.01); *B22F 9/08* (2013.01);
(Continued)

(58) Field of Classification Search
CPC ........................................................ C02F 1/52
See application file for complete search history.

(56) References Cited

U.S. PATENT DOCUMENTS

| 2,052,783 A | * | 9/1936 | Mart ........................ F28C 1/00 |
| | | | 261/DIG. 11 |
| 3,316,075 A | | 4/1967 | Grady |
| | | | (Continued) |

FOREIGN PATENT DOCUMENTS

| CN | 1847411 A | 10/2006 |
| CN | 101301683 A | 11/2008 |
| | (Continued) | |

OTHER PUBLICATIONS

"Granulation of Hot Metal," by 360 Editor, Apr. 23, 2018, 4 pages.
(Continued)

*Primary Examiner* — Chester T Barry
(74) *Attorney, Agent, or Firm* — Perkins Coie LLP; Vijay S. Kumar

(57) ABSTRACT

Treating cooling water in industrial production facilities and associated systems, devices, and methods are disclosed herein. The system can comprise a cooling tower with a first and second cell, each having a housing to receive return water and a sump below to maintain supply water configured to directly contact molten metal. The system includes an inlet and an inlet line to provide return water to the cooling tower and an outlet and an outlet line to direct supply water back to the industrial production facility. The inlet, outlet, and cooling tower form a closed-loop network. Additionally, a blowdown line is fluidically coupled to the outlet to divert a portion of the supply water away from the closed-loop network.

20 Claims, 13 Drawing Sheets

(51) Int. Cl.

| | | |
|---|---|---|
| *B22F 9/04* | (2006.01) | |
| *B22F 9/08* | (2006.01) | |
| *B61D 7/02* | (2006.01) | |
| *B61D 7/32* | (2006.01) | |
| *B61D 17/18* | (2006.01) | |
| *B61K 13/00* | (2006.01) | |
| *C02F 1/52* | (2023.01) | |
| *C21B 7/14* | (2006.01) | |
| *C21B 13/00* | (2006.01) | |
| *C21C 5/52* | (2006.01) | |
| *C21C 7/00* | (2006.01) | |
| *C21C 7/064* | (2006.01) | |
| *C21C 7/068* | (2006.01) | |
| *C22C 33/00* | (2006.01) | |
| *C22C 33/02* | (2006.01) | |
| *C22C 38/00* | (2006.01) | |
| *C22C 38/02* | (2006.01) | |
| *C22C 38/04* | (2006.01) | |
| *G01G 13/00* | (2006.01) | |
| *B22F 9/00* | (2006.01) | |
| *B61D 7/00* | (2006.01) | |
| *C02F 103/16* | (2006.01) | |

(52) U.S. Cl.
CPC .............. *B61D 7/02* (2013.01); *B61D 7/32* (2013.01); *B61D 17/18* (2013.01); *B61K 13/00* (2013.01); *C02F 1/52* (2013.01); *C21B 7/14* (2013.01); *C21B 13/0006* (2013.01); *C21C 5/52* (2013.01); *C21C 7/0006* (2013.01); *C21C 7/0075* (2013.01); *C21C 7/064* (2013.01); *C21C 7/068* (2013.01); *C22C 33/006* (2013.01); *C22C 33/0264* (2013.01); *C22C 33/0271* (2013.01); *C22C 38/002* (2013.01); *C22C 38/02* (2013.01); *C22C 38/04* (2013.01); *G01G 13/006* (2013.01); *B22F 2009/001* (2013.01); *B22F 2009/0808* (2013.01); *B22F 2301/35* (2013.01); *B22F 2304/15* (2013.01); *B22F 2998/10* (2013.01); *B22F 2999/00* (2013.01); *B61D 7/00* (2013.01); *C02F 2103/16* (2013.01); *C02F 2301/02* (2013.01); *Y10T 428/2982* (2015.01)

(56) References Cited

U.S. PATENT DOCUMENTS

| | | | |
|---|---|---|---|
| 3,548,919 A | 12/1970 | Gyongyos et al. | |
| 3,720,404 A | 3/1973 | Carlson et al. | |
| 3,810,542 A * | 5/1974 | Gloster | C02F 1/52 |
| | | | 210/720 |
| 3,888,956 A | 6/1975 | Klint | |
| 3,898,037 A * | 8/1975 | Lange | C02F 5/12 |
| | | | 510/501 |
| 3,923,935 A * | 12/1975 | Cates | F28C 1/14 |
| | | | 261/DIG. 11 |
| 4,139,369 A | 2/1979 | Kandler et al. | |
| 4,153,965 A | 5/1979 | Merly | |
| 4,294,784 A | 10/1981 | Mailund | |
| 4,402,884 A | 9/1983 | Koike et al. | |
| 4,416,707 A | 11/1983 | Foster et al. | |
| 4,546,907 A | 10/1985 | Kemble | |
| 4,694,886 A | 9/1987 | Sakaguchi | |
| 4,786,322 A | 11/1988 | Green | |
| 4,893,568 A | 1/1990 | Adams | |
| 5,017,218 A | 5/1991 | Lundström et al. | |
| 5,084,093 A | 1/1992 | Yamaoka et al. | |
| 5,458,671 A | 10/1995 | Butler et al. | |
| 5,552,058 A * | 9/1996 | Fanning | B01D 53/8659 |
| | | | 210/806 |
| 5,673,779 A | 10/1997 | Spickelmire | |
| 6,041,906 A | 3/2000 | Howard | |
| 6,287,362 B1 | 9/2001 | Levey et al. | |
| 8,646,700 B2 | 2/2014 | Lundström et al. | |
| 9,840,746 B2 | 12/2017 | Lundström | |
| 10,486,234 B2 | 11/2019 | Lundström | |
| 10,618,112 B2 | 4/2020 | Lundström | |
| 2001/0002535 A1* | 6/2001 | Liebig | F01K 23/10 |
| | | | 60/39.182 |
| 2002/0026967 A1 | 3/2002 | Buenemann, Jr. et al. | |
| 2003/0015315 A1 | 1/2003 | Atsushi et al. | |
| 2003/0164062 A1 | 9/2003 | Lundstrom et al. | |
| 2005/0133192 A1 | 6/2005 | Meszaros et al. | |
| 2009/0015028 A1 | 1/2009 | Zamorano Jones | |
| 2009/0171512 A1* | 7/2009 | Duncan | F24F 11/30 |
| | | | 62/157 |
| 2013/0180360 A1 | 7/2013 | Kim et al. | |
| 2015/0330725 A1* | 11/2015 | Gurney | C02F 1/441 |
| | | | 210/182 |
| 2020/0122237 A1 | 4/2020 | Kemper et al. | |

FOREIGN PATENT DOCUMENTS

| | | |
|---|---|---|
| CN | 102700957 A | 10/2012 |
| CN | 103661440 B | 1/2016 |
| CN | 205496553 U | 8/2016 |
| CN | 107385135 A | 11/2017 |
| CN | 207205279 U | 4/2018 |
| CN | 212049627 U | 12/2020 |
| CN | 112305944 A | 2/2021 |
| CN | 113549715 A | 10/2021 |
| CN | 214470214 U | 10/2021 |
| CN | 113828788 A | 12/2021 |
| CN | 114433854 A | 5/2022 |
| CN | 216709283 U | 6/2022 |
| CN | 115417184 A | 12/2022 |
| CN | 115889716 A | 4/2023 |
| CN | 116550982 A | 8/2023 |
| GB | 1287510 A | 8/1972 |
| JP | H02236212 A | 9/1990 |
| JP | H06212212 A | 8/1994 |
| JP | 2001107118 A | 4/2001 |
| JP | 2002282866 A | 10/2002 |
| JP | 2005154847 A | 6/2005 |
| JP | 2020164992 A | 10/2020 |
| JP | 7033949 B2 | 3/2022 |
| JP | 2022149432 A | 10/2022 |
| KR | 20010111750 A | 12/2001 |
| KR | 100370611 B1 | 2/2003 |
| KR | 100847667 B1 | 7/2008 |
| KR | 101086315 B1 | 11/2011 |
| KR | 101091977 B1 | 12/2011 |
| KR | 20130076110 A | 7/2013 |
| KR | 20140102742 A | 8/2014 |
| KR | 20140120631 A | 10/2014 |
| KR | 20160034000 A | 3/2016 |
| KR | 101649584 B1 | 8/2016 |
| KR | 20230028951 A | 3/2023 |
| WO | 2007105039 A2 | 9/2007 |

OTHER PUBLICATIONS

Beskow et al., "Industrial and High-Capacity Production of Granulated Pig Iron," Association for Iron & Steel Technology, AISTech, May 6-9, 2019, pp. 485-493.

Beskow et al., "World's First High-capacity Granshot@ Iron Granulation in Operation at SSAB Oxelosund," AISTech 2009 Proceedings—vol. I, pp. 211-218.

Dupon et al., "Granshot Iron Granulation for Optimized Plant Logistics," METEC InSteelCon Jun. 27-Jul. 1, 2011, Düsseldorf, Germany; 7 pages.

Granulated Pig Iron (GPI), International Iron Metallics Association, accessed Sep. 17, 2024 from https://www.metallics.org/gpi.html; 4 pages.

Industrial and High Capacity Granulation of Pig Iron, Data Sheet, Uvån Hagfors Teknologi AB, Jun. 2019, 4 pages.

(56) References Cited

OTHER PUBLICATIONS

Love et al., "Energy Recovery in Granshot©—Process," KTH Industrial Engineering and Management, Stockholm, Sweden, Nov. 25, 2008, 70 pages.
Lundstrom et al., "Pig Iron Granulation at Iscor Saldanha Steel," AISTech 2004 Proceedings—vol. I, pp. 517-524.
Lundstrom, P. "Iron Granulation in Integrated Steel Plants," Nordic Steel & Mining Review 2006, pp. 16-17.
Polanco et al., "Granulation Methods for Metals and Ferroalloys," pp. 401-410. In: 72nd ABM Annual Congress, São Paulo, 2017.
Vesterberg et al., "Granulated metal product from direct tapped furnace—experience from operation at Befesa Sweden," ATS-JSI Conference, Dec. 17-18, 2012, Paris, France, 2 pages.
International Iron Metallics Association (IIMA), "Use of Granulated Pig Iron (GPI) in the Electric Arc Furnace (EAF)," downloaded Nov. 30, 2024, dated 2018 (no month) (two pages) [wayback machine date of Feb. 9, 2022].
International Search Report and Written Opinion for International Application No. PCT/US2024/046280; Date of Mailing: Dec. 20, 2024; 10 pages.
Italimpianti Orafi, "Atomized metal powder: the revolution of the precious metals market," Online article, May 20, 2021; 2 pages.

\* cited by examiner

TREATING COOLING WATER IN IRON PRODUCTION FACILITIES, AND ASSOCIATED SYSTEMS, DEVICES, AND METHODS

CROSS-REFERENCE TO RELATED APPLICATIONS

The present application claims the benefit of U.S. Provisional Patent Application No. 63/581,946, filed Sep. 11, 2023, and titled "SYSTEM AND METHOD FOR CONTINUOUS GRANULATED PIG IRON (GPI) PRODUCTION," the disclosure of which is incorporated herein by reference in its entirety. The present application is related to the following applications, the disclosures of which are incorporated herein by reference in their entireties: U.S. patent application Ser. No. 18/882,116, filed Sep. 11, 2024, and titled "RAILCARS FOR TRANSPORTING GRANULATED METALLIC UNITS, AND ASSOCIATED SYSTEMS, DEVICES, AND METHODS"; U.S. patent application Ser. No. 18/882,045, filed Sep. 11, 2024, and titled "LOADING GRANULATED METALLIC UNITS INTO RAILCARS, AND ASSOCIATED SYSTEMS, DEVICES, AND METHODS"; U.S. patent application Ser. No. 18/882,191, filed Sep. 11, 2024, and titled "LOW-SULFUR GRANULATED METALLIC UNITS, AND ASSOCIATED SYSTEMS, DEVICES, AND METHODS"; U.S. patent application Ser. No. 18/882,638, filed Sep. 11, 2024, and titled "CONTINUOUS GRANULATED METALLIC UNITS PRODUCTION, AND ASSOCIATED SYSTEMS, DEVICES, AND METHODS"; U.S. patent application Ser. No. 18/882,661, filed Sep. 11, 2024, and titled "USE OF A BASIC OXYGEN FURNACE TO PRODUCE GRANULATED METALLIC UNITS, AND ASSOCIATED SYSTEMS, DEVICES, AND METHODS"; U.S. patent application Ser. No. 18/882,256, filed Sep. 11, 2024, and titled "LOW-CARBON GRANULATED METALLIC UNITS, AND ASSOCIATED SYSTEMS, DEVICES, AND METHODS"; U.S. patent application Ser. No. 18/882,531, filed Sep. 11, 2024, and titled "TORPEDO CARS FOR USE WITH GRANULATED METALLIC UNIT PRODUCTION, AND ASSOCIATED SYSTEMS, DEVICES, AND METHODS"; U.S. patent application Ser. No. 18/882,465, filed Sep. 11, 2024, and titled "USE OF RESIDUAL IRON WITHIN GRANULATED METALLIC UNIT PRODUCTION FACILITIES, AND ASSOCIATED SYSTEMS, DEVICES, AND METHODS"; U.S. patent application Ser. No. 18/882,501, filed Sep. 11, 2024, and titled "PROCESSING GRANULATED METALLIC UNITS WITHIN ELECTRIC ARC FURNACES, AND ASSOCIATED SYSTEMS AND METHODS".

TECHNICAL FIELD

This disclosure relates to treating cooling water in iron production facilities and associated systems, devices, and methods.

BACKGROUND

Granulated pig iron (GPI) is a form of pig iron that is granulated into small, uniform particles, making it easier to handle, transport, and use in different metallurgical processes compared to conventional pig iron. The demand for GPI has been steadily increasing due to its versatile applications in various industries, including automotive, construction, and manufacturing. The growing popularity of GPI can be attributed to its high purity, consistent quality, and the efficiency it brings to the production of steel and other iron-based products.

Granulated pig iron is produced by rapidly cooling molten pig iron with water, resulting in the formation of granules. This process, known as granulation, is typically carried out after blast furnaces. However, current production methods are often characterized by intermittent production cycles due to various operational constraints, such as the need for periodic maintenance, fluctuations in raw material supply, and energy consumption issues. These interruptions not only affect the overall efficiency but also lead to increased production costs and variability in product quality. Therefore, there is a need for an improved production process that can ensure continuous and stable granulation of pig iron, thereby enhancing productivity and reducing operational costs.

BRIEF DESCRIPTION OF THE DRAWINGS

Features, aspects, and advantages of the presently disclosed technology can be better understood about the following drawings.

Figure 1:
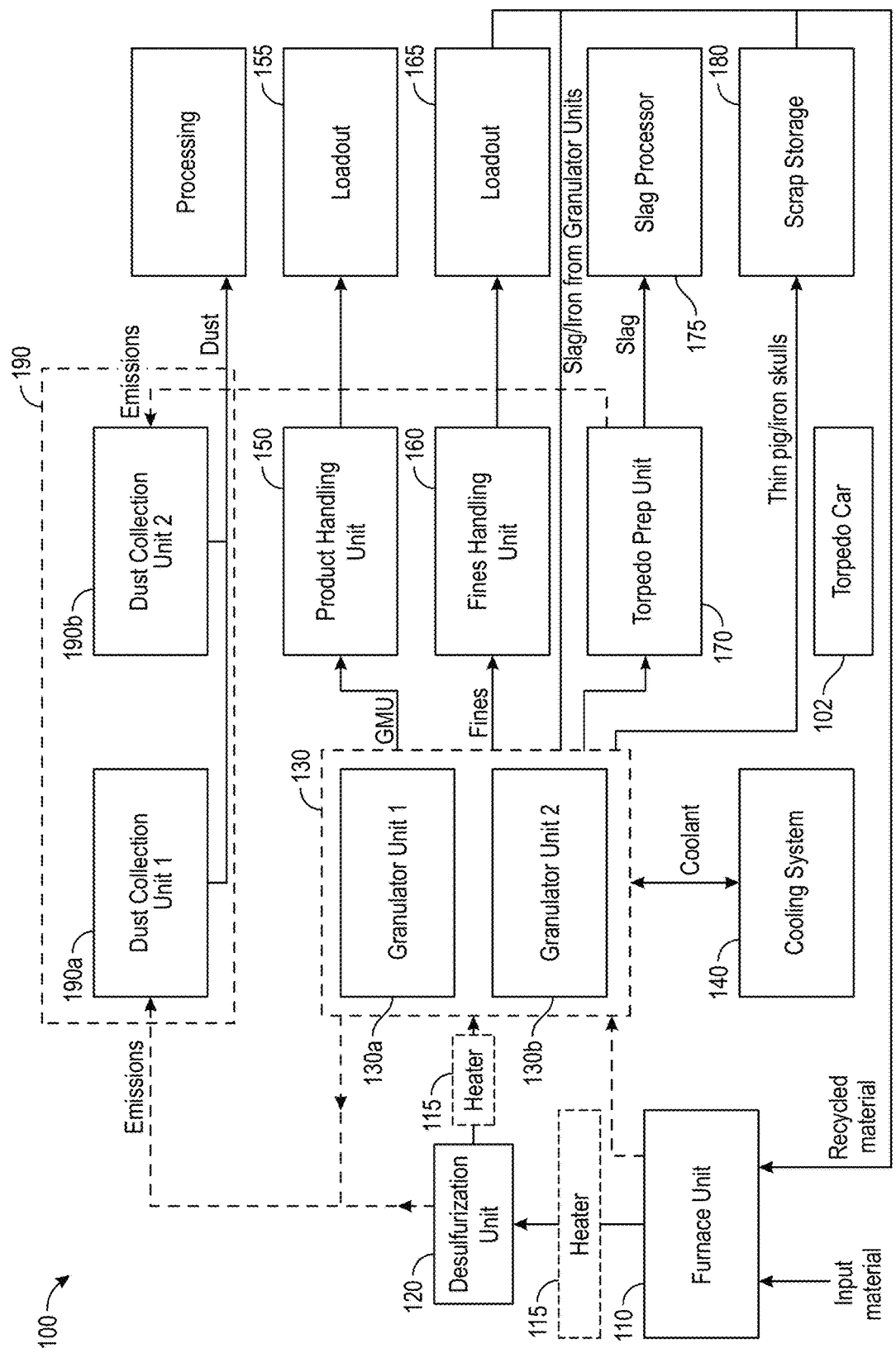
FIG. 1 is a schematic block diagram of a continuous granulated metallic unit (GMU) production system configured in accordance with embodiments of the present technology.

A person skilled in the relevant art will understand that the features shown in the drawings are for purposes of illustrations, and variations, including different or additional features and arrangements thereof, are possible.

DETAILED DESCRIPTION

I. Overview

The present technology is generally directed to treating cooling water in industrial production facilities (e.g., iron production facilities, pig iron production facilities, steel production facilities, etc.) and associated systems, devices, and methods. Cooling towers and/or cooling tower systems can be used with or as a part of industrial production facilities to cool heated cooling water, which is then reintroduced into the industrial production facility for further use. In most facilities, cooling water does not directly contact the metal (e.g., iron, pig iron, cast iron, steel, etc.) being produced in industrial production facilities. Instead, the water indirectly cools aspects of the process and/or equipment of the system. In certain industrial production facilities, such as facilities that produce GPI, direct contact between the cooling water and metal can occur, however such facilities do not operate on a continuous basis, e.g., for at least 6, 12 or 24 hours. As a result, the amount of cooling water needed for these non-continuous facilities is relatively minimal, and such cooling water systems can be drained to remove fine particulate materials at relatively minor costs.

Direct contact of cooling water with molten metal in industrial production facilities that operate continuously can introduce microparticles into the cooling water that are smaller than 500 microns (e.g., no more than 100 microns, 50 microns, 20 microns, 10 microns, 1 micron, or 0.1 microns). Additionally or alternatively, direct contact of cooling water with components of industrial production facilities, such as furnaces and refractory linings, can introduce micro-slag, micro-metal, micro-iron, and/or micro-refractory into the cooling water. Microparticles, as described herein, can include various types of suspended solids in the cooling water, such as micro-metal, micro-iron, micro-steel, micro-slag, micro-refractory, and/or the like. In some embodiments, the return water contains approximately 20% to 40% microparticles ranging from 1 to 10 microns in size. Additionally or alternatively, suspended solids in the water can be between 500 ppm and 1000 ppm, with a settling time that can span from 250 to 500 days or between 1 to 5 years. This prolonged settling time makes it extremely challenging to recirculate the cooling water without first removing some of these microparticles to maintain system efficiency and prevent potential damage. Cooling tower systems can use filtration (e.g., lamella clarifiers, hydrocyclones, lamella separators, cyclone separators, mesh filters, sand filters, etc.) to remove particles suspended in the return water. However, current filtration systems do not remove microparticles from the cooling water due to the size of the microparticles. As such, microparticles buildup overtime and can negatively affect the components of the cooling tower system and/or the industrial production facility. For example, microparticles can accumulate in the equipment of the industrial production facilities (e.g., granulator units, furnaces, etc.) reducing the components efficiency and potentially causing overheating or damage to the equipment.

Additionally, performing maintenance on cooling tower systems for industrial production facilities can be difficult because cooling towers are typically designed without excess capacity. For example, cooling towers are typically designed to utilize each and every cell of the cooling tower. As such, shutting down individual cells is not possible because the remaining cells cannot provide sufficient cooling capacity for the industrial production facility. For this reason, individual cells are not designed to be isolated from one another, let alone while one or more other cells remain operational. This leads to inefficiency and lower levels of iron being produced.

Embodiments of the present technology, which include cooling towers designed for industrial production facilities configured to operate continuously, address at least some of these issues by incorporating a blowdown line into the cooling tower system to remove microparticles that enter the cooling water closed-loop network loop via direct contact between the cooling water and molten metal of the industrial production facility. The blowdown line can be fluidically coupled to an outlet of a cooling tower, allowing a portion of a supply water in the cooling tower to be directed away from the closed-loop network (e.g., a network including an inlet, outlet, and/or the cooling tower of the cooling tower system) and/or to an external system that is not fluidically coupled to the cooling tower. By having a higher flow rate of blowdown, the system can be "flushed" more regularly, preventing microparticles from building up in the cooling tower and/or in the industrial production facility. Embodiments of the present technology can further comprise a makeup line to make up supply water directed out of the closed-loop network and the cooling water lost to evaporative losses, and an array of pumps and valve arrangements to operate the cooling tower and provide sufficient cooling needs to the industrial production facility (e.g., a granulator unit configured to produce granulated metallic units, steel, and/or iron).

To improve maintenance efficiency, the cooling tower system can further include one or more isolated cells, each with its own housing positioned to receive return water from the industrial production facility and a sump below the housing to maintain a level of the supply water. Each cell can fluidically couple a trough that extends below each of the cells and is positioned to direct a portion of the supply water back to the industrial production facility. The isolated cells of the cooling tower allow one cell to undergo maintenance while one or more of the other cells continue operating, allowing the cooling tower system and the industrial production facility to continuously operate. The present technology provides a consistent water supply to the industrial production facility, lowering the likelihood of microparticle buildup in the industrial production facility and/or the cooling tower system, increasing the efficiency of metal production, and decreasing the maintenance requirements of the cooling tower system and/or the industrial production facility. Additional benefits of embodiments of the present technology are described elsewhere herein.

Industrial production systems, such as Granulated metallic unit (GMU) production systems, are designed for continuous operation. Relative to non-continuous industrial production systems, embodiments of the present technology enhance energy efficiency and reduce emissions by minimizing the need for frequent shutdowns and restarts, which are often associated with excessive venting and/or less efficient operations. As described herein, some embodiments include (i) a desulfurization unit that lowers the sulfur content in molten metal, thereby reducing sulfur dioxide ($SO_2$) emissions, (ii) dust collection units that filter out particulate matter, thereby reducing air pollution, (iii) infrastructure to recycle fines, slag, iron skulls, and other residual iron/previously-processed iron, thereby reducing the environmental impact associated with raw material extraction and conserving natural resources, (iv) water management and cooling systems that minimize heat losses, enhance thermal efficiency of production processes, and optimize water consumption, and/or (v) isolated cooling tower cells that can provide a continuous water supply, thereby reducing the start and stop of production facilities. Overall, the continuous industrial production system enhances productivity while minimizing greenhouse gas emissions and waste, contributing to more sustainable industrial practices and helping mitigate climate change.

Relatedly, conventional industrial production system have a significant environmental impact due to its high energy consumption and emissions of pollutants. As such, embodiments of the present technology which relate to industrial production systems that can reduce this impact. Sulfur, phosphorus, and silicon in GPI negatively affect the quality and properties of final metal products, leading to issues like reduced ductility, toughness, and weldability, as well as surface defects and brittleness. These impurities also contribute to the formation of non-metallic inclusions and excessive slag, complicating metal processing and compromising product quality. Sulfur, in particular, accelerates the wear and erosion of metal processing equipment, increasing maintenance costs and decreasing equipment lifespan. Embodiments of the present technology include methods for removing these impurities in part can improve the quality and durability of final metal products and enhance the efficiency and lifespan of processing equipment, leading to cost savings and more sustainable production practices.

In the Figures, identical reference numbers identify generally similar, and/or identical, elements. Many of the details, dimensions, and other features shown in the Figures are merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below.

II. Embodiments of a Continuous Granulated Metallic Unit Production System

FIG. 1 is a schematic block diagram of a continuous GMU production system 100 ("the system 100") configured in accordance with embodiments of the present technology. As explained elsewhere herein, GMUs can include granulated iron (GI), granulated pig iron (GPI), granulated steel (GS), or GMU. Relatedly, molten metal can include molten pig iron or molten steel. As used herein, the term "continuous" should be interpreted to mean continuous operations cycles, including in batch or semi-batch operations, for at least 4 hours, 6 hours, 8 hours, 10 hours, 12 hours, 16 hours, 20 hours, or 24 hours. The system 100 can include a furnace unit 110, a desulfurization unit 120, granulator units 130 including a first granulator unit 130a and a second granulator unit 130b, and a cooling system 140. The furnace unit 110 can receive input materials (e.g., iron ore, coke, limestone, and/or preheated air) and/or recycled material, which can be sourced from downstream components of the system 100 as described in further detail herein. Equations (1)-(6) below detail some of the chemical processes controlled at the furnace unit.

$$C + O_2 \rightarrow CO_2 \quad (1)$$

$$CO_2 + C \rightarrow 2CO \quad (2)$$

$$Fe_2O_3 + 3CO \rightarrow 2Fe + 3CO_2 \quad (3)$$

$$Fe_2O_3 + 3C \rightarrow 2Fe + 3CO \quad (4)$$

$$CaCO_3 \rightarrow CaO + CO_2 \quad (5)$$

$$CaO + SiO_2 \rightarrow CaSiO_3 \quad (6)$$

Equation (1) represents the combustion of coke, which is a form of carbon. When coke reacts with oxygen gas introduced into the furnace (e.g., via an oxygen lance), it forms carbon dioxide. This exothermic reaction releases a significant amount of heat, which is essential for maintaining the high temperatures required for subsequent reactions. The carbon dioxide produced via Equation (1) further reacts with additional coke to form carbon monoxide, as illustrated by Equation (2). This endothermic reaction helps to moderate the temperature within the furnace unit 110. Equations (3) and (4) represent the reduction of iron ore ($Fe_2O_3$). As illustrated by Equation (3), the iron oxide reacts with the carbon monoxide produced via Equation (2), which acts as a reducing agent to convert iron ore into iron and produces carbon dioxide as a byproduct. Alternatively, as illustrated by Equation (4), the iron ore may be reduced directly by the coke, albeit less commonly. Equations (5) and (6) represent the formation of slag. As illustrated by Equation (5), the calcium carbonate/limestone ($CaCO_3$) can decompose into calcium oxide and carbon dioxide at the high temperatures of the furnace unit 110. As illustrated by Equation (6), the calcium oxide can then react with silica ($SiO_2$), an impurity in the iron ore, to form calcium silicate ($CaSiO_3$), also known as slag. The furnace unit 110 can output molten iron (from Equations (3) and (4)) and slag (from Equations (5) and (6)).

In some embodiments, the input materials (e.g., the coke, the iron ore, and/or the limestone) include sulfur, which can remain in the molten iron output by the furnace unit 110. A torpedo car 102 or other transfer vessel can transfer the molten iron from the furnace unit 110 to the desulfurization unit 120. The desulfurization unit 120 can include equipment to reduce the sulfur content of the molten iron. For example, one or more lances can be used to deliver magnesium (Mg), calcium carbide ($CaC_2$), or other sulfur-reducing agent to the molten iron. In some embodiments, the molten iron is desulfurized while remaining inside the torpedo car 102. Equations (7) and (8) below detail the reactions between the sulfur and the sulfur-reducing agents.

$$Mg + S \rightarrow MgS \quad (7)$$

$$CaC_2 + S \rightarrow CaS + 2C \quad (8)$$

The resulting substances, including magnesium sulfide (MgS) and calcium sulfide (CaS), are not soluble in molten iron and will therefore be in solid form (e.g., as solid particles) that can be more readily removed at the desulfurization unit 120 and/or further downstream. As discussed further herein, reducing the sulfur content can increase the quality of the GMU product and/or allow the production process to be continuous. After the desulfurization process, the torpedo car 102 can transfer the molten iron from the desulfurization unit 120 to the granulator units 130. In some embodiments, as indicated by the dashed arrow, the desulfurization unit 120 is bypassed and the molten iron is transferred directly from the furnace unit 110 to the granulator units 130. Notably, conventional facilities may not include a desulfurization unit or may otherwise lack the ability to desulfurize molten iron. One reason for this is that conventional steelmaking facilities directly feed molten iron from blast furnaces to basic oxygen furnaces, and opt to granulate the molten iron only when the basic oxygen furnaces are down. Because producing GPI is a backup operation for such facilities, the added complexity and costs associated with establishing desulfurization equipment may not be economical.

In some embodiments, the temperature of the molten iron is within a predetermined range prior to reaching the granulator units 130. For example, maintaining the molten iron in a sufficiently fluid state can better ensure the formation of uniform granules and help avoid premature solidification, which can lead to irregular granule shapes and sizes. In some embodiments, the system includes one or more heaters 115 before and/or after the desulfurization unit 120, e.g., to reheat the molten iron within the torpedo car 102. For example, if the temperature of the molten iron is below a threshold temperature value, the heater 115 can be used to raise the temperature of the molten iron in the torpedo car 102 to be within a desired temperature range. The threshold temperature value can vary between different compositions, and can be between 2300-2500° F., between 2300-2400° F., or between 2340-2350° F. In some embodiments, the heater 115 comprises one or more oxygen lances.

The torpedo car 102 can transfer the molten iron to one of the granulator units 130. While FIG. 1 illustrates two granulator units 130, it will be understood that the system 100 can include one, three, four, five, six, or more granulator units 130. The granulator units 130 can each include a granulation reactor that receives and granulates molten iron to form granulated products. For example, the granulation reactor can include a cavity that holds water, and the molten iron can be transferred (e.g., poured, sprayed) onto a target of the reactor holding the water. The water can be maintained at a sufficiently low temperature by the cooling system 140 (e.g., cooled directly by pumping the water between the granulator units 130 and the cooling system 140, cooled indirectly by pumping a coolant separate from the water that receives the molten iron). In some embodiments, the granulator units 130 each includes one or more components for controlling the flow of molten iron from the torpedo car 102 to the granulation reactor. As one of ordinary skill in the art will appreciate, flow control can affect the shape, size, and quality of the granulated products. The granulator units 130 can also include a dewatering assembly for drying the granulated products from the granulation reactor to output GMU. The granulator units 130 can further include a classifier assembly for filtering the filtrate from the dewatering assembly to output fines.

The system 100 can further include a product handing unit 150 to receive the GMU output by the granulator units 130 (e.g., by the dewatering assembly), and a loadout 155 downstream of the product handling unit 150. Additionally, the system 100 can further include a fines handling unit 160 to receive the fines output by the granulator units 130 (e.g., by the classifier assembly), and a loadout 165 downstream of the fines handling unit 160. In some embodiments, the product handling unit 150 and/or the fines handling unit 160 each includes one or more conveyor belts, diverters, stockpile locations, etc. The system 100 can additionally include a torpedo preparation unit 170 that can remove slag and/or kish from the torpedo car 102. For example, the torpedo car 102, after delivering the molten iron to the granulator units 130, can proceed to the torpedo prep unit 170 to be cleaned or otherwise prepared for the next cycle of transferring molten iron. The removed slag can be subsequently transferred to a slag processor 175. The system 100 can further include a scrap storage 180 that can receive thin pig and/or iron skulls from the granulator units 130.

As shown in FIG. 1, the fines at the loadout 165, slag and/or iron from the granulator units 130, and/or the thin pig and/or iron skulls at the scrap storage 180 can be fed back into the furnace unit 110 as recycled materials. In some embodiments, the recycled materials are processed (e.g., pelletized) prior to being fed into the furnace unit 110. Furthermore, emissions from various components of the system 100 can be collected and directed towards a dust collection unit 190 (e.g., a baghouse, a scrubber, etc.). In FIG. 1, for example, the emissions from the desulfurization unit 120 and the granulator units 130 are directed to a first dust collection unit 190*a*, and the emissions from the torpedo prep unit 170 are directed to a second dust collection unit 190*b*. Each of the dust collection units 190 can filter the emissions to remove dust therefrom so that clean waste gas is sent to stacks (not shown) to be released into the atmosphere, and the removed dust can be directed to further processing.

Figure 2:
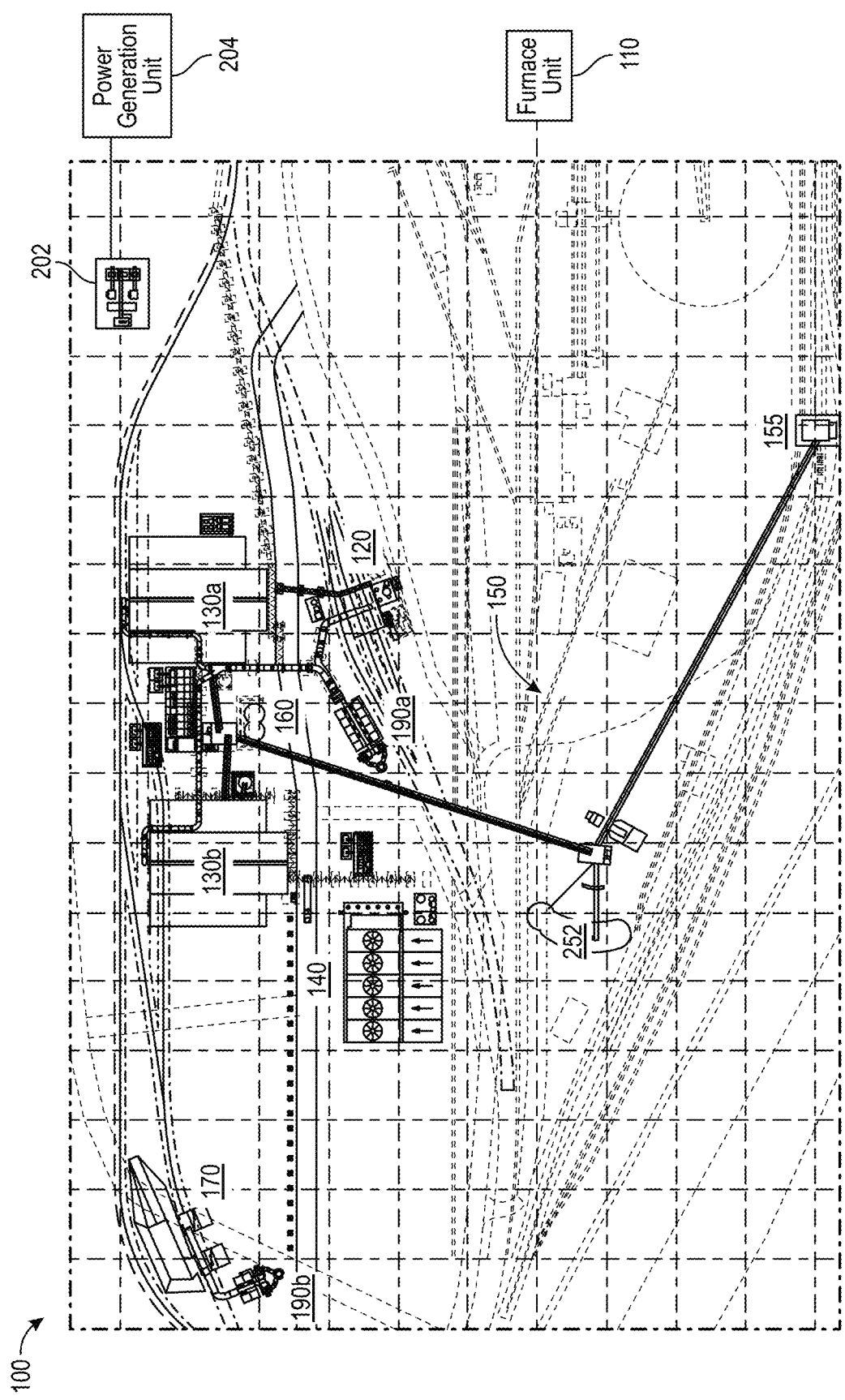
FIG. 2 is a plan view of the continuous GMU production system of FIG. 1, configured in accordance with embodiments of the present technology.

FIG. 2 is a plan view of the continuous GMU production system 100. It will be appreciated that the plan view illustrated in FIG. 2 is merely one example, and that the components of the system 100 can be arranged differently in other embodiments. As shown, the system 100 can further include an electrical building 202 and a power generation unit 204 for providing electrical power to the system 100. As discussed further herein, one or more of the components of the system 100 can be powered electrically as opposed to, e.g., hydraulically. The furnace unit 110 can be located away from many of the other components of the system 100. The torpedo car 102 or other transfer vessel (not shown) can transfer the molten iron from the furnace unit 110 to the desulfurization unit 120 along tracks illustrated in dashed lines.

Figure 3:
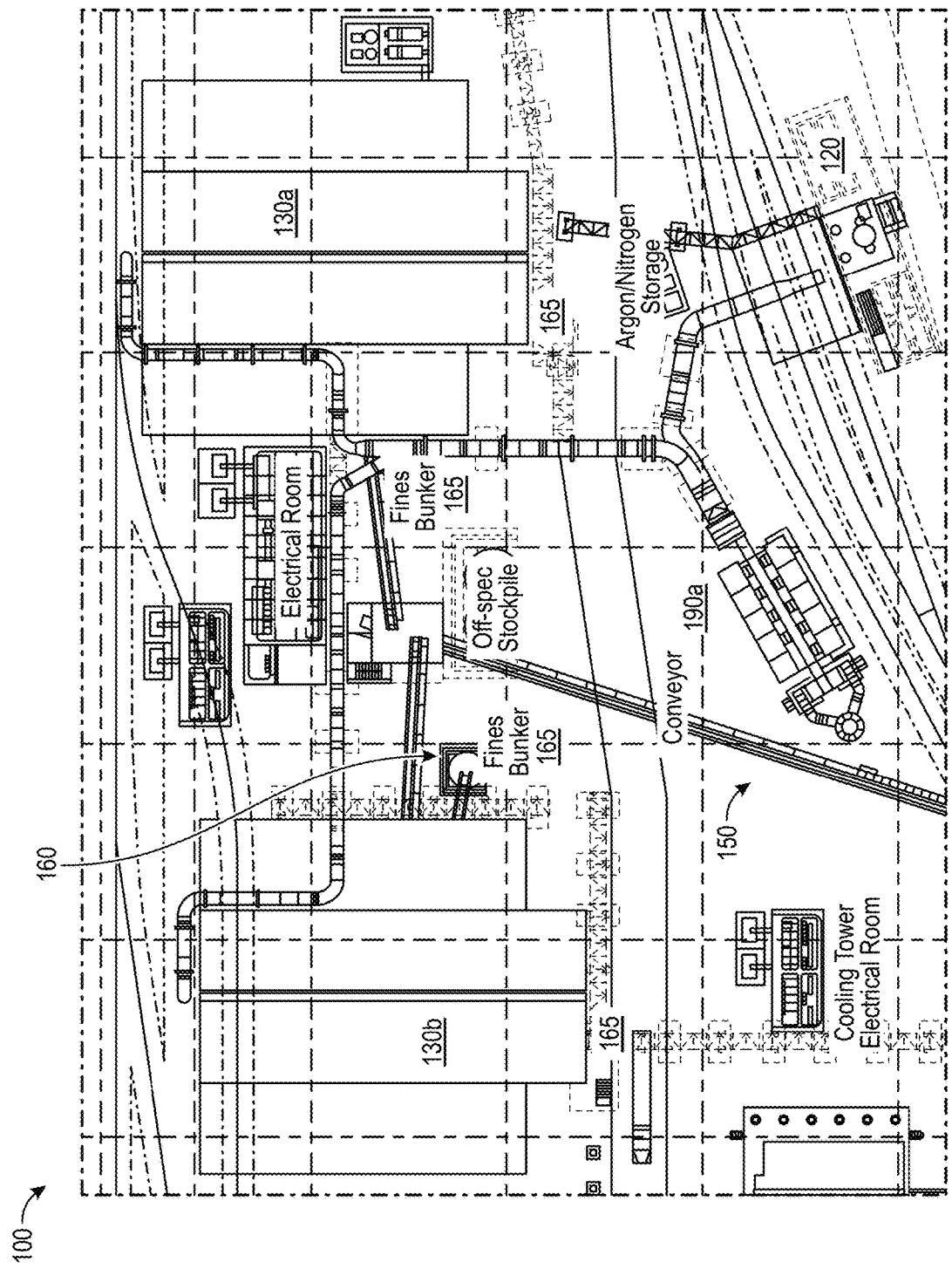
FIG. 3 is an enlarged view of the continuous GMU production system of FIG. 2.

Referring momentarily to FIG. 3, which is an enlarged plan view of the system 200, the desulfurization unit 120 can desulfurize the molten iron while the molten iron remains in the torpedo car 102. Once the molten iron is desulfurized, the torpedo car 102 can continue along the tracks to the granulator units 130. The torpedo car 102 can deliver the molten iron to either of the first granulator unit 130*a* or the second granulator unit 130*b* depending on, e.g., the availability of each of the granulator units 130. The GMU produced by each of the granulator units 130 can be transferred downstream via one or more conveyor belts that form part of the product handling unit 150. The fines produced by each of the granulator units 130 can be transferred to fines bunkers located adjacent to the granulator units 130 and ultimately sent to the loadout(s) 165. As shown in FIG. 3, the first dust collection unit 190*a* can be connected to each of the desulfurization unit 120 and the granulator units 130 via pipes to collect emissions therefrom.

Returning to FIG. 2, the cooling system 140 can be located adjacent to the granulator units 130 to provide cooling thereto as needed. The product handling unit 150 can include a stockpile area 252 for storing GMU products. One or more conveyor belts can extend between each of the granulator units 130 and the stockpile area 252, and between the stockpile area 252 and the loadout 155. In some embodiments, the loadout 155 comprises a building at which a desired quantity of GMUs can be measured and transferred to a railcar or other transfer vehicle. In some embodiments, the GMUs is subsequently transferred to an electric arc furnace (not shown) for steel production. The torpedo car 102, after delivering the molten iron to the granulator units 130, can continue along the tracks to reach the torpedo prep unit 170. As discussed above with reference to FIG. 1, the torpedo prep unit 170 can facilitate removal of slag and/or kish from the torpedo car 102. The second dust collection unit 190*b* can be connected to the torpedo prep unit 170 via pipes to collect emissions therefrom.

Referring to FIGS. 1-3 together, the system 100 is expected to be able to continuously produce GMU, unlike conventional GMU production systems. First, the inclusion of the desulfurization unit 120 provides several advantages. For example, GMUs with lower sulfur content produces less slag when melted at an electric arc furnace downstream, saving associated time, costs, and energy consumption. The use of GMUs with lower sulfur content can also ease maintaining the desired chemical composition and temperature, reducing the frequency of adjustments and interruptions during the melting cycle. Lower sulfur levels can also result in less wear and tear on other components of the system, reducing maintenance needs and associated downtime.

Second, the inclusion of a plurality of granulator units 130 allows molten iron to be granulated at separate granulator units in parallel. The granulator units 130 can also serve as backups for one another in case one of the granulator units 130 is down (e.g., due to malfunctioning components, maintenance, etc.). Furthermore, in some embodiments, the various components of the granulator units 130 are modular. For example, each of the components can be easily and independently removed (e.g., for maintenance) and/or replaced (e.g., via an overhead crane) without impacting operation of the other components.

Figure 4:
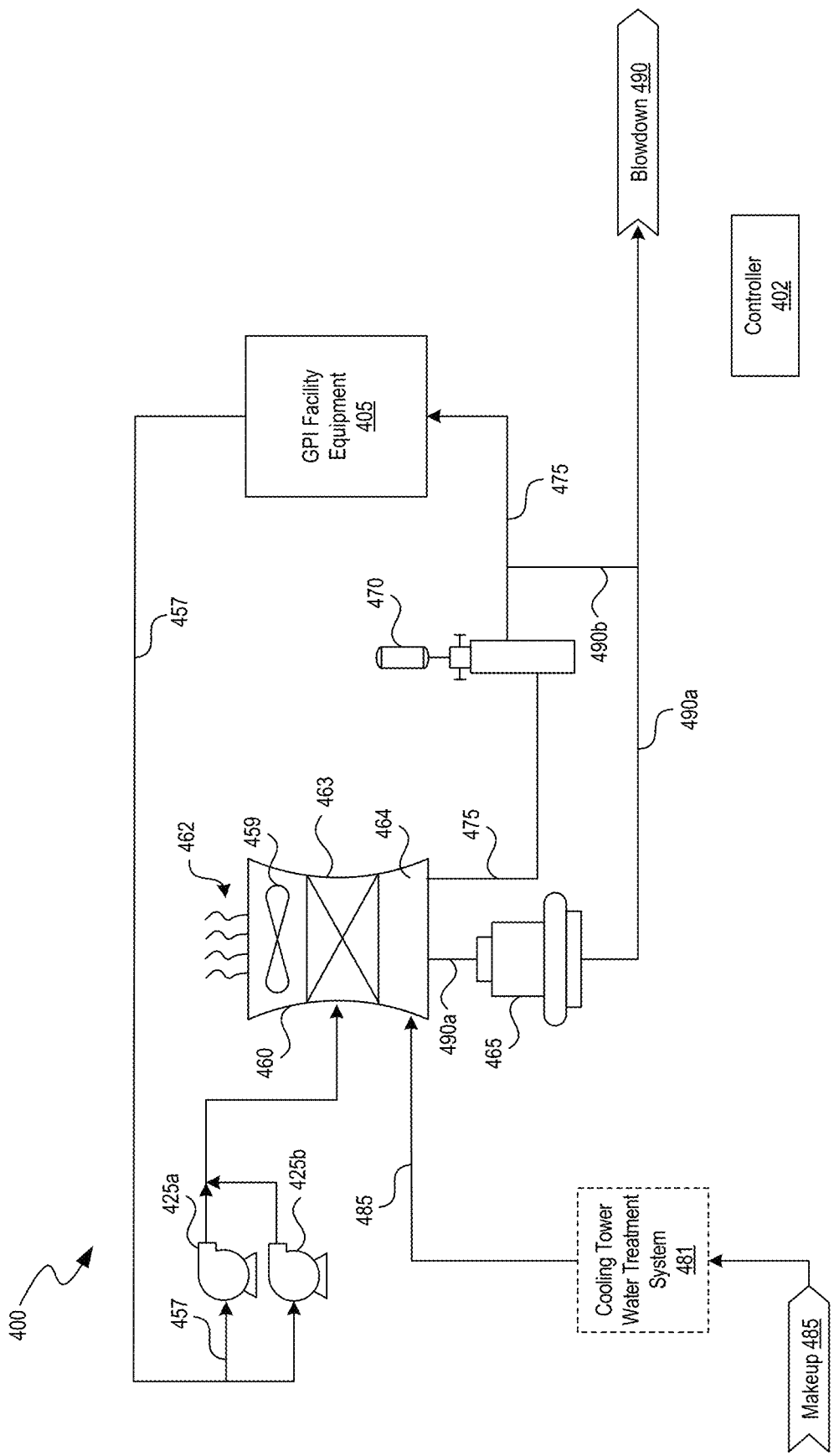
FIGS. 4 and 5 illustrate schematic views of cooling tower systems for treating cooling water in industrial production facilities, configured in accordance with embodiments of the present technology.

III. Treating Cooling Water in Industrial Production Facilities and Associated Systems, Devices, and Methods FIG. 4 illustrates a schematic view of a cool tower system 400 ("the cooling tower system 400") for treating cooling water in industrial production facilities, configured in accordance with embodiments of the present technology. The cooling tower system 400 can include GPI facility equipment 405, a cooling tower 460, an inlet line 457, an outlet line 475, and a controller 402 in communication with one or more components of the cooling tower system 400. The GPI facility equipment 405 can be fluidically coupled to the cooling tower 460 via the inlet line 457 and the outlet line 475. The inlet line 457 can be configured to direct a return water, for example, a cooling water that has directly contacted metal, from the GPI facility equipment 405 to the cooling tower 460.

In some embodiments, the return water is water that has directly contacted metal in the industrial production facility and/or with one or more components of the industrial production facility, such as furnaces and/or refractory linings. For example, the return water can be configured to include microparticles (e.g., micro-iron, micro-steel, micro-slag, micro-refractory, etc.) or particles suspended in the return water with sizes less than 0.1 micron, 1 micron, 5 microns, 10 microns, 15 microns, or 20 microns, within a range of 0.1 micron to 20 microns, or any value therebetween (e.g., 0.13 microns, 7 microns, etc.). Additionally or alternatively, the return water can be a heated cooling water from the industrial production facility. In some embodiments, the return water contains approximately between 0.5% and 20% suspended solid less than 1 micron, 20% to 40% suspended solids ranging from 1 to 10 microns in size, 40% to 80% suspended solids ranging from 10 to 60 micron in size, and/or 25% to 40% suspended solids ranging from 60 to 200 micron in size. Additionally, suspended solids in the water can be between 500 ppm and 1000 ppm. The settling time for these particles can span from 8 to 750 days or between 1 to 5 years. Generally, as particle size decreases, settling time increases. Therefore, return water with a high percentage of microparticles will typically have a higher percentage of particles that will not settle during continuous operation, making it extremely challenging to recirculate the cooling water without first removing some of these microparticles to maintain system efficiency and prevent potential damage. In some embodiments, the return water is received at the cooling tower 460 at a flow rate of at least 10,000, 20,000, 30,000, 40,000, or 50,000 gallons per minute, within a range of 10,000 to 50,000 gallons per minute, or any value therebetween. In some embodiments, one or more return water pumps 425*a*, 425*b* (collectively referred to as "return water pumps 425") can direct the return water to the cooling tower 460. In some embodiments, the return water pumps 425 are one or more centripetal pumps.

The cooling tower 460 can include a fan 459, a housing 463, and a sump 464. The inlet line 457 can fluidically couple the housing 463 such that the housing can receive the return water from the GPI facility equipment 405. The fan 459 can introduce air into the housing 463 to cool the return water. During this process, a portion of the return water is lost to evaporative losses 462 and the sump 464 can collect the cooled return water (also referred to herein as "supply water"). In some embodiments, large solids are collected in the cooling tower 460 and removed from the cooling tower system 400, as described in more detail with reference to FIG. 7. The supply water collected in the cooling tower 460 can be directed back to the GPI facility equipment 405 via the outlet line 475. The outlet line 475 can include a supply water pump 470 configured to direct supply water to one or more components within the GPI facility equipment 405 (e.g., granulator units, furnaces, desulfurization units, etc.). For example, the supply water can be directed to the GPI facility equipment 405 at a flow rate of at least 10,000, 20,000, 30,000, 40,000, or 50,000 gallons per minute, within a range of 10,000 to 50,000 gallons per minute, or any value therebetween. In some embodiments, the supply water pump 470 is a vertical turbine. The return water pumps 425 and supply water pump 470 can be electrically coupled to the controller 402 such that the controller 402 can maintain consistent and balanced flow of cooling water from the GPI facility equipment 405 to the cooling tower 460 and from the cooling tower 460 to the GPI facility equipment 405.

In some embodiments, the inlet line 457 is fluidically coupled to an inlet of the cooling tower system 400 and the outlet line 475 is fluidically coupled to an outlet of the cooling tower system 400, as described in more detail with reference to FIGS. 9 and 10. Additionally or alternatively, the inlet (e.g., including the inlet line 457), the outlet (e.g., including the outlet 475), and the cooling tower 460 can form a closed-loop network, meaning that the supply water that is not removed as blowdown can continuously circulate between the GPI facility equipment 405 and the cooling tower 460 without exposure to external environments. This closed-loop network can help maintain a continuous water supply to the industrial production facilities described herein. In some embodiments, the controller 402 can regulate the flow of return water and/or supply water within and/or directed away from the closed-loop network. In some embodiments, the cooling tower system 400 generates significant energy through the evaporative losses 462 (e.g., when cooling the return water from 140° C. to 80° C.). It is worth noting that an energy recovery system (not illustrated) can be integrated into the cooling tower system 400. For instance, the energy generated via the closed-loop system could be captured, via a heat recovery mechanism (e.g., steam generator, heat pump, electricity generator, heating, etc.) and utilized as electricity or related uses for various components within the cooling tower system 400 and/or the industrial production facilities described herein.

The cooling tower system 400 is expected to be able to continuously direct supply water configured to directly contact metal back to the GPI facility equipment 405, unlike conventional cooling tower systems. It is worth noting that although FIG. 4 depicts the GPI facility equipment 405, the GPI facility equipment can be more generally an industrial production facility configured to produce GMU, as described in more detail with reference to FIGS. 1-3. The industrial production facility can be a GMU production facility, where the GMU has a mass fraction of carbon less than 4.0 wt. %. Additionally or alternatively, the industrial production facility can also be a GS production facility, where the GS has a mass fraction of carbon less than 1.0 wt. %. In some embodiments, the industrial production facility is a GPI production facility, where the GPI has a mass fraction of carbon more or less than 4.0 wt. %. In each example, the supply water can directly contact the respective product to produce the return water. For example, the supply water can directly contact the molten metal (e.g., molten iron, molten pig iron, molten steel, etc.) during a granulation process, effectively cooling the molten metal into the granulated products described above. In some embodiments, the supply water can control the shape of the granulated product, for example, by converting the molten metal from the liquid state to the solid state (e.g., using a granulation process as described herein). The molten metal can be at a temperature of at least 1050° C., 1100° C., 1150° C., 1200° C., 1250° C., 1300° C., 1350° C., 1400° C., 1450° C., or 1500° C., within a range of 1050° C. to 1500° C., or any value therebetween. In some embodiments, the molten metal Additionally or alternatively, the molten metal can have a freezing temperature of at least 1040° C., 1090° C., 1100° C., 1150° C., 1200° C., 1210° C., or 1230° C., within a range of 1040° C. to 1230° C., or any value therebetween.

The cooling tower system 400 can further include a sump pump 465 configured to direct a first portion of the supply water as a first portion of blowdown 490a from the cooling tower 460. Additionally or alternatively, a second portion of blowdown 490b can be directed from an outlet of the cooling tower 460 and/or from the outlet line 475. The first portion of blowdown 490a and the second portion of blowdown 490b (collectively referred to as "the blowdown 490") can be directed away from the cooling tower 460 and/or to an external system that is not fluidically coupled to the cooling tower 460. For example, the external system can include a blowdown treatment system, a ditch, a lake, etc. generally near the industrial production facility, as described in more detail with reference to FIG. 13. In some embodiments, the blowdown 490 is referred to as blowdowns and/or blowdown line(s). The blowdowns and/or blowdown lines can be interpreted to include generally similar or identical features and functionalities to the blowdown 490 and/or any other blowdown described herein.

To maintain the water levels in the cooling tower system 400, a makeup line 485 can introduce makeup water into the cooling tower 460. In some embodiments, the makeup water can come from a cooling tower water treatment system 481. The cooling tower water treatment system 481 can incorporate dispersants into the makeup water. For example, the dispersants can include sodium polyacrylate, sodium hexametaphosphate, polyphosphates, lignosulfonates, polycarboxylates, polyacrylic acid, naphthalene sulfonate formaldehyde condensates, polyethylene glycol, alkylbenzene sulfonates, or polyvinyl alcohol to break up and/or disperse substances within the supply water.

In some embodiments, the flow rate of the blowdown 490 directed to the external system is generally equivalent to the flow rate of the makeup water introduced into the cooling tower. For example, the blowdown 490 can be directed toward the external area at a flow rate of at least 1,000, 2,000, 3,000, 4,000, 5,000, 6,000, 7,000, 8,000, 9,000, 10,000, 11,000, or 12,000 gallons per minute, within a range of 1,000 to 12,000 gallons per minute, or any value therebetween. Similarly, the makeup water can be directed toward the cooling tower at a flow rate of at least 1,000, 2,000, 3,000, 4,000, 5,000, 6,000, 7,000, 8,000, 9,000, 10,000, 11,000, or 12,000 gallons per minute, within a range of 1,000 to 12,000 gallons per minute, or any value therebetween. As described above, the controller 402 can monitor and/or regulate the flow rate of the blowdown 490, the evaporative losses 462, and/or the makeup water within the makeup line 485 such that a consistent cooling water supply remains within the cooling tower system 400.

In some embodiments, the flow rate of the blowdown 490 directed to an external system leads to a generally higher turnover, meaning that the cooling water within the system is replaced more frequently. This can decrease the likelihood of buildup in the cooling tower system, reducing maintenance requirements and increasing metal production rates at the industrial production facility. In some embodiments, the first portion of the supply water can be turned over at most every 100, 200, 300, 400, or 500 minutes, within a range of 100 to 500 minutes, or any value therebetween. Similarly, the cycle of the cooling tower system can be at most 1, 2, 3, or 4, within a range of 1 to 4, or any value therebetween. The cycle can represent a ratio of the concentration of dissolved solids in the first portion of the supply water relative to the concentration of dissolved solids in the second portion of the supply water. In some embodiments, the industrial production facility produces at least 10, 50, 100, 200, 400, 1000, or 2000 tons of metal per hour, within a range of 10 to 2000 tons of metal per hour, or any value therebetween. Additionally or alternatively, the industrial production facility produces at least 750, 1000, 3000, 7500, 20000, 30000, or 40000 tons of metal per day, within a range of 750 to 40000 tons of metal per day, or any value therebetween. In some embodiments, the ratio of blowdown 490 to metal produced in the industrial production facility is at least 100, 250, 750, 1250, 3000, or 5000 gallons of supply water/ton of metal produced, within a range of 100 to 5000 gallons of supply water/ton of metal produced, or any value therebetween. Additionally or alternatively, the ratio of supply water directed to the GPI facility equipment 405 to metal produced in the industrial production facility is at least 100, 250, 750, 1250, 3000, or 5000 gallons of supply water/ton of metal produced, within a range of 100 to 5000 gallons of supply water/ton of metal produced, or any value therebetween.

Figure 5:
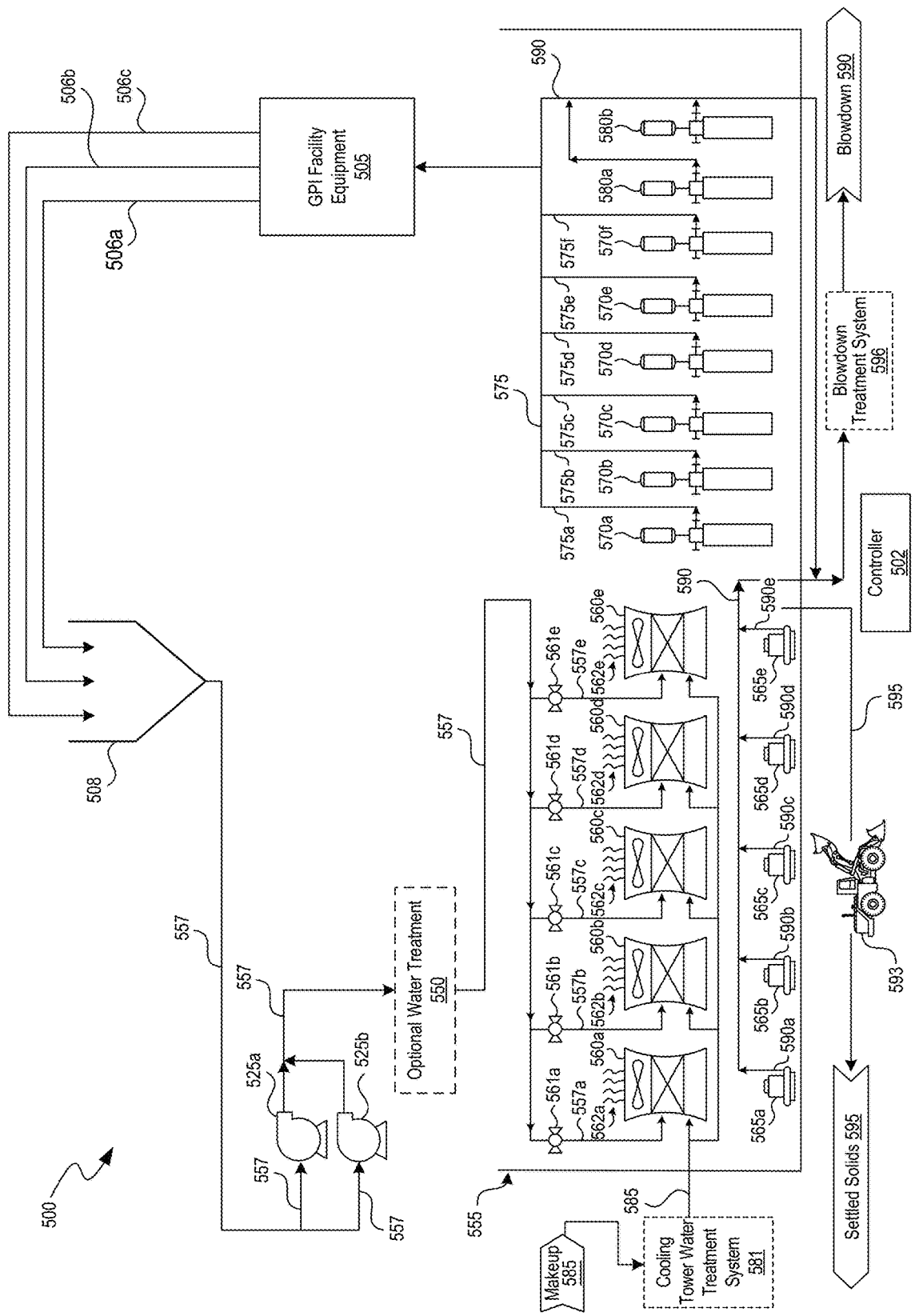

FIG. 5 illustrates a schematic view of a cool tower system 500 ("the cooling tower system 500") for treating cooling water in industrial production facilities, configured in accordance with embodiments of the present technology. The cooling tower system 500 can include any features or functionalities of the cooling tower system 400 of FIG. 4. The cooling tower system 500 can include GPI facility equipment 505, a cooling tower 555, an inlet lines 557a-557e (collectively referred to as "the inlet lines 557"), return water pumps 525a, 525b (collectively referred to as "the return water pumps 525") an outlet line 575, and a controller 502 in communication with one or more components of the cooling tower system 500 that include features and functionalities of the GPI facility equipment 405, the cooling tower 460, the inlet line 457, the return water pumps 425, the outlet line 475, and the controller 402 of FIG. 4.

In some embodiments, the cooling tower system 500 includes one or more return lines 506a-506c (collectively referred to as "return lines 506"). The return lines 506 can direct return water from one or more components of the GPI facility equipment 505 to a collection tank 508, as described in more detail with reference to FIG. 6. The collection tank 508 can be a hollow tank configured to maintain a level of the return water before directing the return water to the cooling tower 555.

The inlet lines 557 can direct the return water from the collection tank 508 to the cooling tower 555. In some embodiments, the return water pumps 525 direct the return water to the cooling tower 555 and/or to an optional water treatment 550. The optional water treatment 550 can be a supplemental water treatment system that can include, for example, a full flow lamella clarification or a side stream lamella clarification. In some embodiments, the optional water treatment 550 removes at least a portion of the particles from the return water before the return water is directed to the cooling tower 555, for example, lowering the amount of microparticles in the return water.

The cooling tower 555 can include one or more cells 560a-560e (collectively referred to as "cells 560") that cool the return water to supply water, generating evaporative losses 562a-562e (collectively referred to as "evaporative losses 562"). The cells 560 and the evaporative losses 562 can each include any features or functionalities of the cooling tower 460 and the evaporative losses 462 of FIG. 4. In some embodiments, the return water is directed through one or more valves 561a-561e (collectively referred to as "valves 561") positioned along the inlet lines 557. The valves 561 can fluidically couple the inlet lines 557 to the cells 560 such that the return water can be selectively distributed to the cells 560. The inclusion of the valves 561 and the cells 560 allows the return water to be cooled in individual cells in parallel. The cells 560 can also serve as backups for one another in case one of the cells 560 is down (e.g., due to malfunctioning components, maintenance, etc.). Furthermore, in some embodiments, the various components of the cells 560 are modular. For example, the cells 560 can each include a basin, a weir, a gate, etc., that can be easily and independently removed (e.g., for maintenance) and/or replaced without impacting operation of the other cells, as described in more detail with reference to FIGS. 7, 9, and 10. In some embodiments, settled solids 595 from the cells 560 are collected and directed away from the cooling tower system 500 by a loading truck 593 to be disposed of, for example, in a landfill. The removal of settled solids 595 is described in more detail with reference to FIGS. 7 and 9.

In some embodiments, the cooling tower 555 can include one or more supply water pumps 570a-570f (collectively referred to as "supply water pumps 570"). The supply water pumps 570 can be positioned such that one or more outlet lines 575a-575f (collectively referred to as "outlet lines 575") can direct supply water from the cooling tower 555 to the GPI facility equipment 505. In some embodiments, the supply water pumps 570 are positioned with a trough to direct supply water from the trough to the GPI facility equipment 505, as described in more detail with reference to FIG. 8.

The cooling tower 555 can include one or more sump pumps 565a-565e (collectively referred to as "sump pumps 565") positioned below a sump (e.g., the sump 464 of FIG. 4) of the cells 560. The sump pumps 565 can include any features or functionalities of the sump pump 465 described in FIG. 4 and can be positioned to direct a portion of the supply water from the cells 560 as blowdowns 590a-590e (collectively referred to as "blowdowns 590"). Additionally or alternatively, one or more blowdown pumps 580a, 580b (collectively referred to as "blowdown pumps 580") can direct a portion of the blowdowns 590 from the outlet lines 575 away from the cooling tower system 500. For example, the blowdown can be directed to an external system such as a ditch and/or a lake generally near the industrial production facility and/or the cooling tower system. The blowdowns 590 can also be directed to a blowdown treatment system 596 that includes a flocculant supply, where a flocculant, such as polyacrylamide, polyethylene oxide, aluminum sulfate, ferric chloride, or polydiallyldimethylammonium chloride, can be introduced into the supply water. Similarly, to maintain the water levels in the cooling tower system 500, a makeup line 585 can introduce makeup water into the cooling tower 555. In some embodiments, the makeup water can come from a cooling tower water treatment system 581. The cooling tower water treatment system 581 and the makeup line 585 can include any features or functionalities of the cooling tower water treatment system 481 and the makeup line 485 of FIG. 4.

Figure 6:
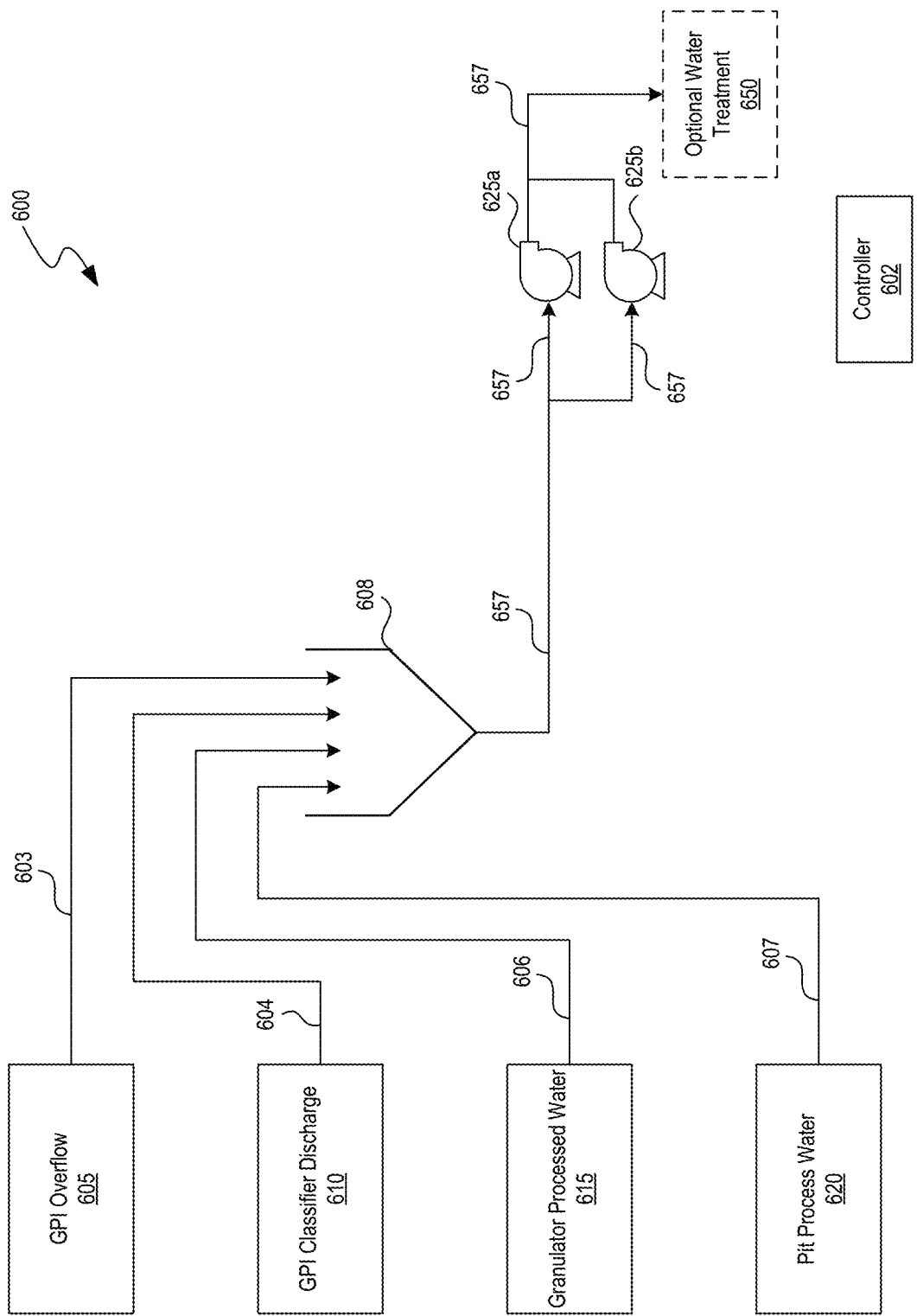
FIG. 6 illustrates a schematic view of a collection tank of a cooling tower system for treating cooling water in industrial production facilities, configured in accordance with embodiments of the present technology.

FIG. 6 illustrates a schematic view of a collection tank 608 of a cooling tower system 600 for treating cooling water in industrial production facilities, configured in accordance with embodiments of the present technology. The cooling tower system 600 can include a collection tank 608, an inlet line 657, return water pumps 625a, 625b (collectively referred to as "return water pumps 625"), an optional water treatment 650, the controller 602 can include any features or functionalities of the cooling tower system 500, the collection tank 508, the inlet lines 557, the return water pumps 525a, 525b, the optional water treatment 550, and/or the controller 502 of FIG. 5. The cooling tower system 600 depicts that the return water can be a GPI overflow 605, a GPI classifier discharge 610, a granulator processed water 615, and a pit process water 620 (e.g., return water collected in a pit or sump for treatment throughout the industrial production facility). The sources for the GPI overflow 605, the GPI classifier discharge 610, the granulator processed water 615, and the pit process water 620 can be described in more detail with reference to FIGS. 1-3. In some embodiments, the cooling tower system 600 includes a GPI overflow return line 603, a GPI classifier discharge line 604, a granulator processed water line 606, a pit process water line 607 that include any features or functionalities of the return lines 506 of FIG. 5.

Figure 7:
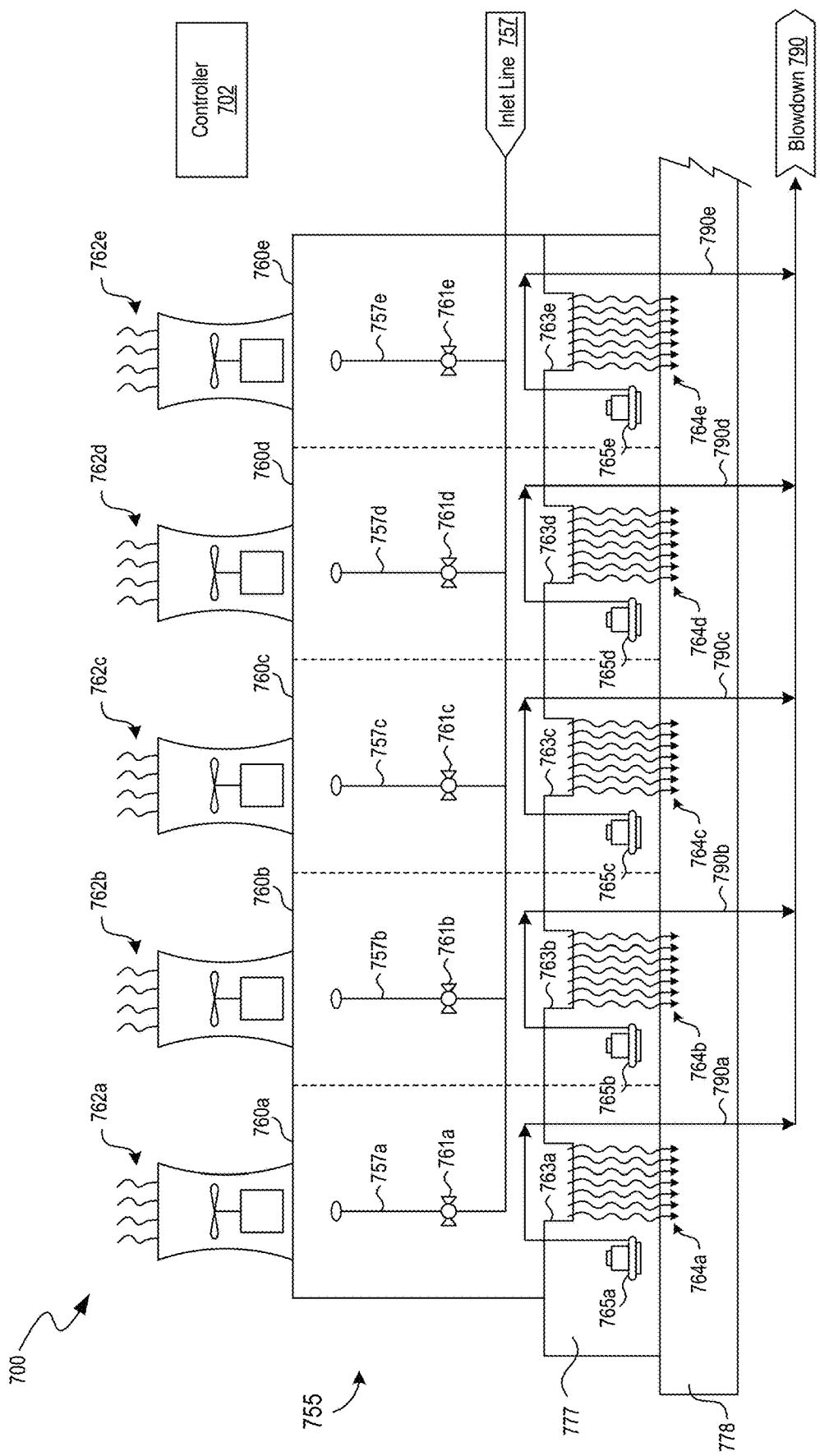
FIG. 7 illustrates a schematic view of a cooling tower of a cooling tower system for treating cooling water in industrial production facilities, configured in accordance with embodiments of the present technology.

FIG. 7 illustrates a schematic view of a cooling tower 755 of a cooling tower system 700 for treating cooling water in industrial production facilities, configured in accordance with embodiments of the present technology. The cooling tower 755 and/or the cooling tower system 700 can include any features or functionalities of the cooling tower(s) 460, 555 and/or the cooling tower systems 400, 500 of FIGS. 4 and 5. The cooling tower system 700 can further include cells 760a-760e (collectively referred to as "cells 760"), evaporative losses 762a-762e (collectively referred to as "evaporative losses 762"), inlet lines 757a-757e (collectively referred to as "inlet lines 757"), valves 761a-761e (collectively referred to as "valves 761"), blowdowns 790a-790e (collectively referred to as "blowdowns 790"), sump pumps 765a-765e (collectively referred to as "sump pumps 765"), and a controller 702 that can include any features or functionalities of the cells 560, the evaporative losses 562, the inlet lines 557, the valves 561, the blowdowns 590, the sump pumps 565, and the controller 502 of FIG. 5. The cooling tower 755 can further include a basin 777 below the cells 760 and a trough 778 below the basin 777.

In some embodiments, the basin 777 include weirs 763a-763e (collectively referred to as "weirs 763"). The weirs 763 can be configured as gates that open and/or close to direct supply water 764a-764e (collectively referred to as "supply water 764") from an individual one of the cells 760 into the basin 777 and/or into the trough 778. The basin 777 can include one or more regions associated with each of the cells 760 that extend beyond a perimeter of the cooling tower 755, as described in more detail with reference to FIG. 9. The trough 778 can extend below the sump of the cells 760 across a portion and/or an entirety of the length of the cooling tower 755. Additionally or alternatively, the trough 778 can be configured to direct a portion of the supply water back to the industrial production facility, as described in more detail with reference to FIG. 8.

Figure 8:
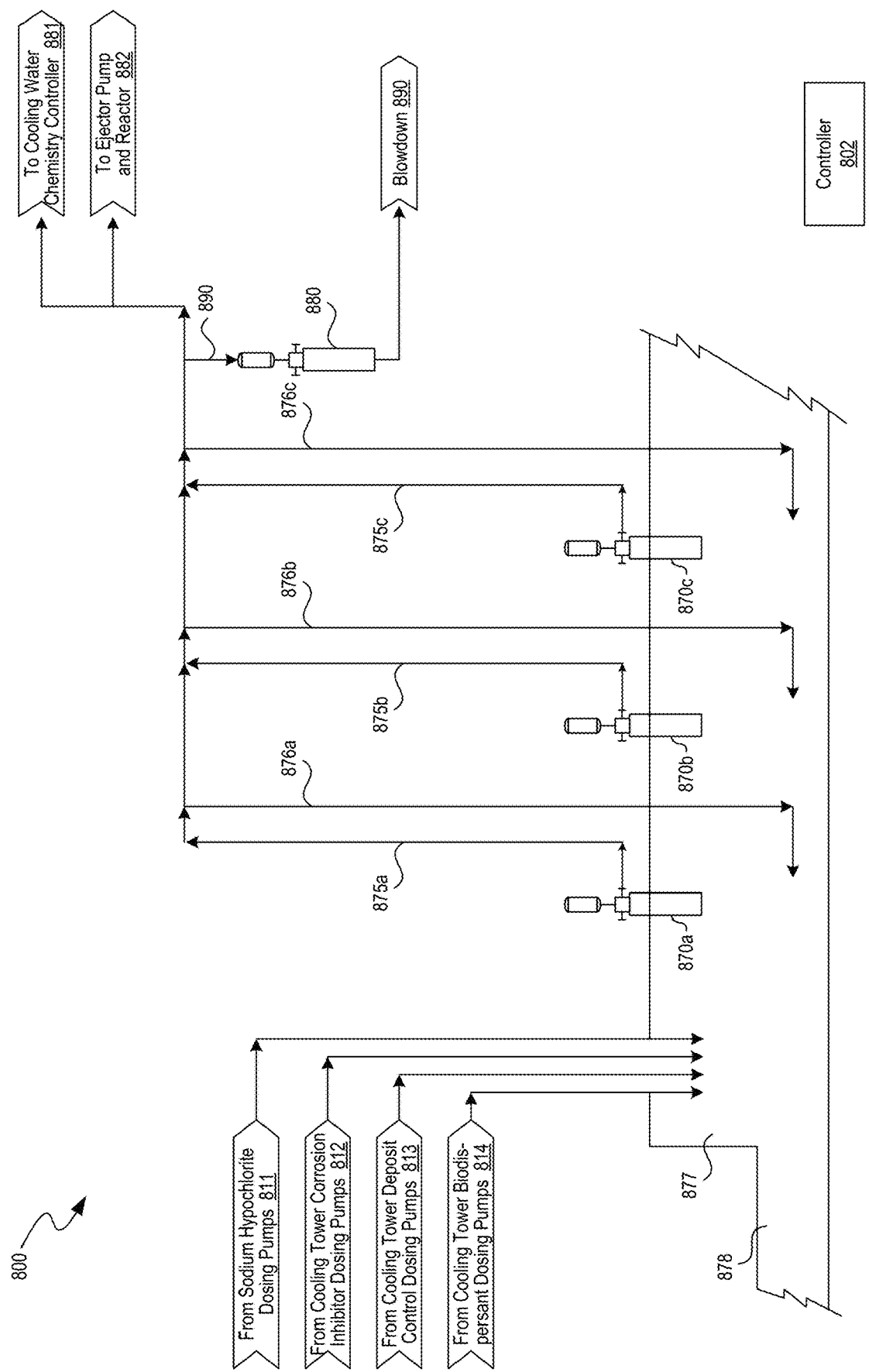
FIG. 8 illustrates a schematic view of pumps of a cooling tower system for treating cooling water in industrial production facilities, configured in accordance with embodiments of the present technology.

FIG. 8 illustrates a schematic view of supply water pumps 870a-870c (collectively referred to as "supply water pumps 870") of a cooling tower system 800 for treating cooling water in industrial production facilities, configured in accordance with embodiments of the present technology. The supply water pumps 870 and the cooling tower system 800 can include any features or functionalities of the supply water pumps 470, 570 and the cooling tower systems 400, 500 of FIGS. 4 and 5. The cooling tower system 800 can further include outlet lines 875a-875c (collectively referred to as "outlet lines 875"), a blowdown pump 880, a blowdown 890, a basin 877, a trough 878, and a controller 802 that can include any features or functionalities of the outlet lines 575 of FIG. 5, the blowdown pumps 580 of FIG. 5, the blowdown(s) 490, 590, 790 of FIGS. 4, 5, and 7, the basin 777 of FIG. 7, the trough 778, and the controller 702 of FIG. 7, respectively.

The supply water pumps 870 can be positioned within the basin 877 and/or the trough 878 such that the supply water can be directed from the cooling tower back to one or more components of the industrial production facility. In some embodiments, the supply water pumps 870 pump the return water through the outlet lines 875 to a cooling water chemistry controller 881 or an ejector pump and reactor 882. The cooling water chemistry controller 881 can be a part of a blowdown treatment system (e.g., the blowdown treatment system 596 of FIG. 5) and/or the optional water treatment 550. Additionally or alternatively, the cooling water chemistry controller 881 can be a water treatment system that refines the chemistry of the return water before reentering the components of the industrial production facility. The ejector pump and reactor 882 can be a part of the granulation reactor, as described in more detail with reference to FIGS. 1-3.

The cooling tower system 800 can further include recycle lines 876a-876c (collectively referred to as "recycle lines 876"). The recycle lines 876 can be configured to redirect the supply water from the outlet lines 875 back into the trough 878 and/or the basin 877, thereby ensuring continuous circulation within the system at consistent flow rates. In some embodiments, the recycle lines 876 are directed towards the basin 877 and/or the trough 878 to clean settled sediments on and/or around the supply water pumps 870. The configuration further allows the cooling tower system 800 to maintain appropriate water levels and enhance cooling efficiency by redirecting the water back to the trough 878 and/or the basin 877 to maintain a consistent supply water flow rate. Furthermore, this configuration can ensure that no supply water is wasted if there is remaining supply water within the outlet lines 875.

In some embodiments, the cooling tower system 800 includes one or more makeup lines (e.g., the makeup lines 485, 585 of FIGS. 4 and 5). The makeup lines can come from one or more cooling water treatment systems (e.g., the cooling tower water treatment systems 481, 581 of FIGS. 4 and 5). For example, the makeup lines can come from sodium hypochlorite dosing pumps 811, cooling tower corrosion inhibitor dosing pumps 812, cooling tower deposit control dosing pumps 813, and cooling tower bio-dispersant dosing pumps 814 configured to treat the supply water to control microbial growth, prevent corrosion, reduce deposits, and/or disperse biological contaminants.

Figure 9:
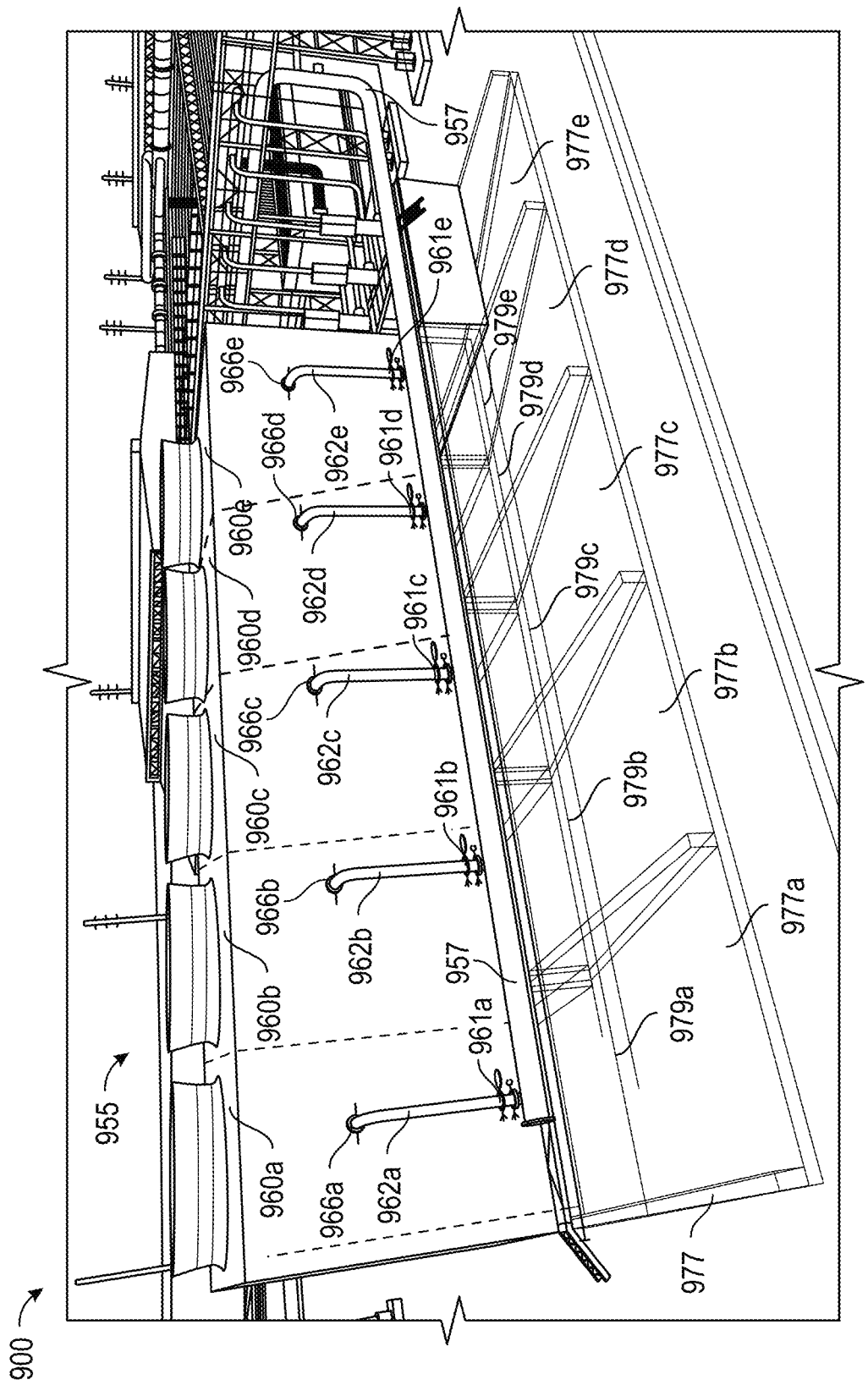
FIGS. 9 and 10 show various views of a cooling tower of a cooling tower system for treating cooling water in industrial production facilities, configured in accordance with embodiments of the present technology.
Figure 10:
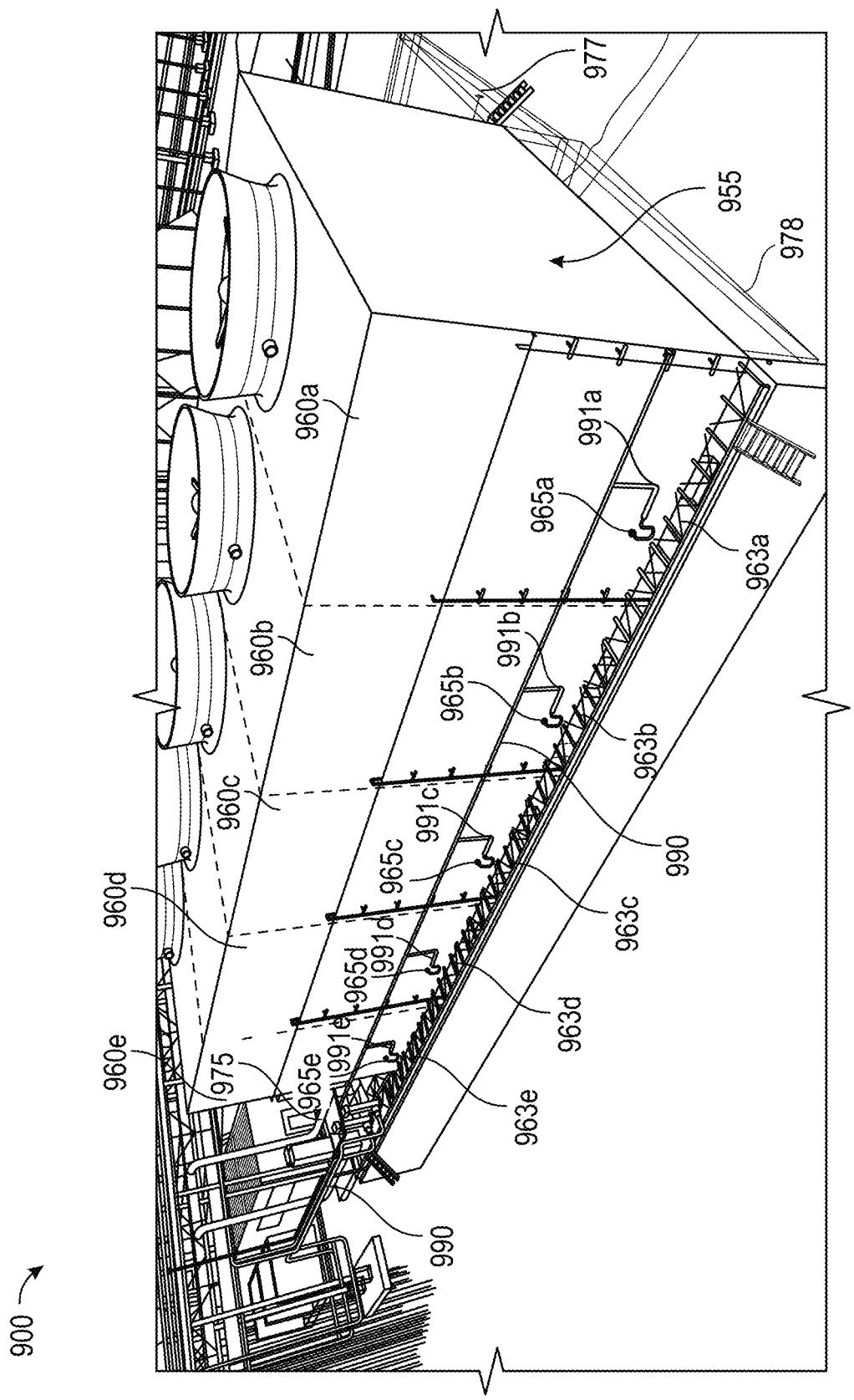

FIGS. 9 and 10 show various views of a cooling tower 955 of a cooling tower system 900 for treating cooling water in industrial production facilities, configured in accordance with embodiments of the present technology. The cooling tower 955 and the cooling tower system 900 can include any features or functionalities of the cooling towers 460, 555, 755 and/or the cooling tower systems 400, 500, 700 of FIGS. 4, 5, and 7. Referring now to FIG. 9, the cooling tower system 900 can further include inlet line 957, valves 961a-961e (collectively referred to as "valves 961"), cells 960a-960e (collectively referred to as "cells 960"), and basin regions 977a-977e (collectively referred to as "basin regions 977") that can include any features or functionalities of the inlet lines 457, 557 of FIGS. 4 and 5, the valves 561 of FIG. 5, the cells 560 of FIG. 5, and the basin 777 of FIG. 7, respectively.

The cooling tower system 900 can further include inlet tubes 962a-962e (collectively referred to as "inlet tubes 962") and inlets 966a-966e (collectively referred to as "inlets 966"). The inlet line 957 can fluidically couple a bottom end of the inlet tubes 962 such that the return water with the inlet line 957 can be directed into each of the cells 960. The valves 961 can be positioned along the inlet tubes 962 such that the valves 961 can regulate the flow of the return water entering the cells 960. The return water can enter the cells 960 via the inlets 966. In some embodiments, the bottom portion of the cells 960 of the cooling tower 955 (e.g., each including a housing 463 and/or sump 464, as described in more detail with reference to FIG. 4) can define a perimeter. The basin regions 977 associated with each of the cells 960 can extend beyond the perimeter at an angle of at most −40 degrees, −30 degrees, −20 degrees, −10 degrees, within a range of −40 degrees to −10 degrees, or any value therebetween. This configuration allows settled solids from the cells 960 and/or the supply water to fall and collect in the basin regions 977, as described further herein.

Referring now to FIG. 10, the cooling tower system 900 can further include weirs 963a-963e (collectively referred to as "weirs 963"), a blowdown 990, and a trough 978 that can include any features or functionalities of the weirs 763, the blowdown 790, and the trough 778 of FIG. 7. The cooling tower system 900 can further include an outlet line 975 that can include any features or functionalities of the outlet lines 575, 1175 of FIGS. 5 and 11. Additionally, the cooling tower system 900 can further include sump pump outlets 965a-965e (collectively referred to as "sump pump outlets 965") and blowdown tubes 991a-991e (collectively referred to as "blowdown tubes 991"). The weirs 963 can include a gate configured to direct supply water into the basin regions 977 and/or the trough 978. Each of the weirs 963 in the cells 960 can open and/or close independently to allow the supply water and/or settled solids collected in the cells 960 to independently fall into the basin regions 977 and/or into the trough 978. In some embodiments, a loading truck (e.g., the loading truck 593 of FIG. 5) collects the settled solids from flat portions 979a-979e (collectively referred to as "flat portions 979") of the basin regions 977. For example, the basin regions 977 can be configured as ramps on which the loading truck can be positioned to collect the settled solids and direct them away from the cooling tower system 900. Each of the cells 960 can be isolated and blowdown can be drained via a sump pump (e.g., the sump pumps 565 of FIG. 5). As shown in FIG. 10, the blowdown 990 can be directed out of the cells 960 via the sump pump outlets 965 and through the blowdown tubes 991 into the blowdown 990. In some embodiments, the configuration of the blowdown tubes 991 and blowdown 990 enables the cells 960 to be drained separately from one another.

Figure 11:
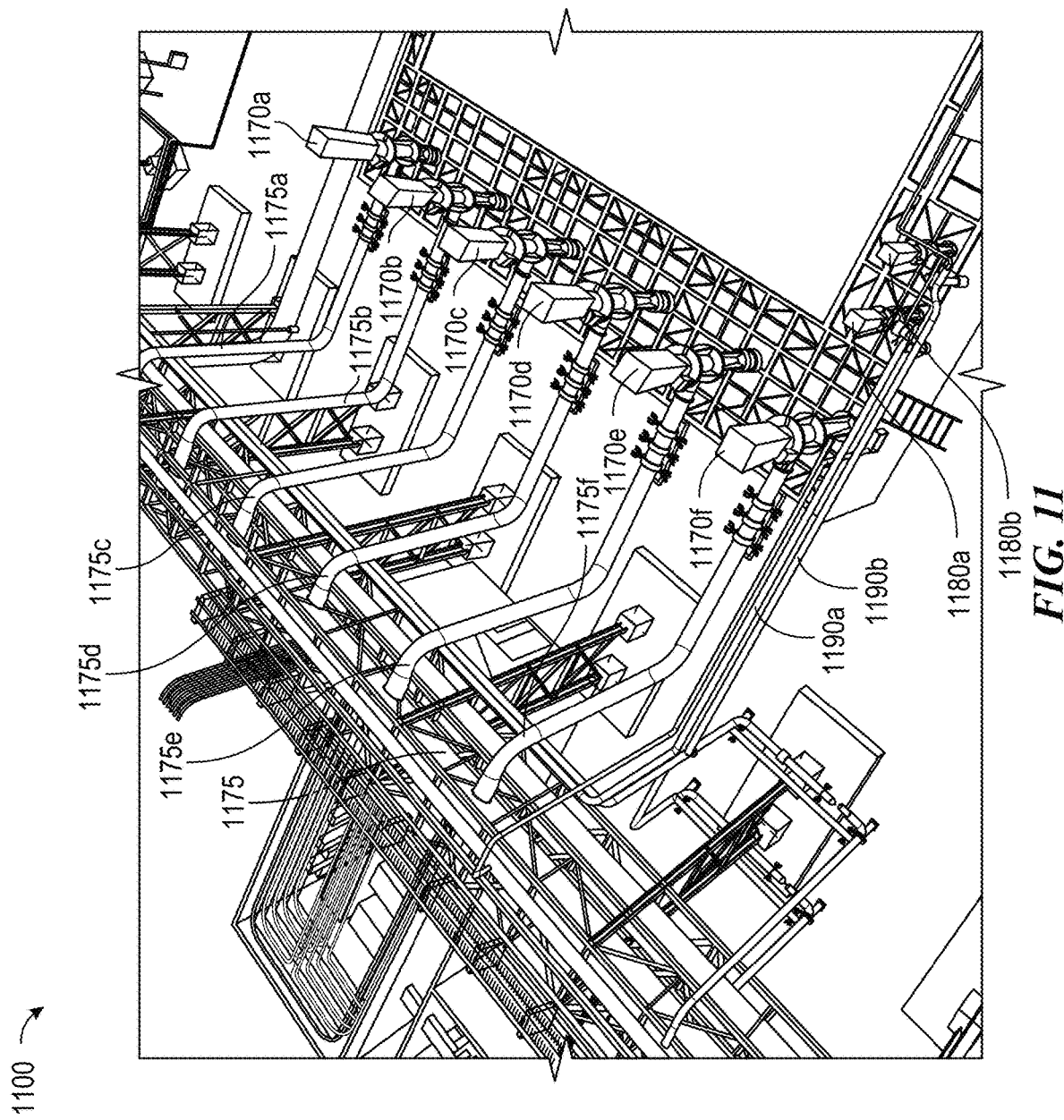
FIG. 11 shows a view of pumps of a cooling tower system for treating cooling water in industrial production facilities, configured in accordance with embodiments of the present technology.

FIG. 11 shows a view of supply water pumps 1170a-1170f (collectively referred to as "supply water pumps 1170") of a cooling tower system 1100 for treating cooling water in industrial production facilities, configured in accordance with embodiments of the present technology. The supply water pumps 1170 and/or the cooling tower system 1100 can include any features or functionalities of the supply water pumps 470, 570, 870 and/or the cooling tower systems 400, 500, 800 of FIGS. 4, 5, and 8, respectively. Additionally, the cooling tower system 1100 can include outlet lines 1175a-1175f (collectively referred to as "outlet lines 1175"), blowdown pumps 1180a, 1180b (collectively referred to as "blowdown pumps 1180"), and blowdowns 1190a, 1190b (collectively referred to as "blowdowns 1190") that can include any features or functionalities of the outlet lines 575, blowdown pumps 580, and blowdowns 590 of FIG. 5. As shown in FIG. 11, the supply water pumps 1170 can generally maximize the supply water returned to the industrial production facility and the blowdown pumps 1180 can generally maximize the portion of the supply water directed away from the cooling tower system 1100 as blowdown.

Figure 12:
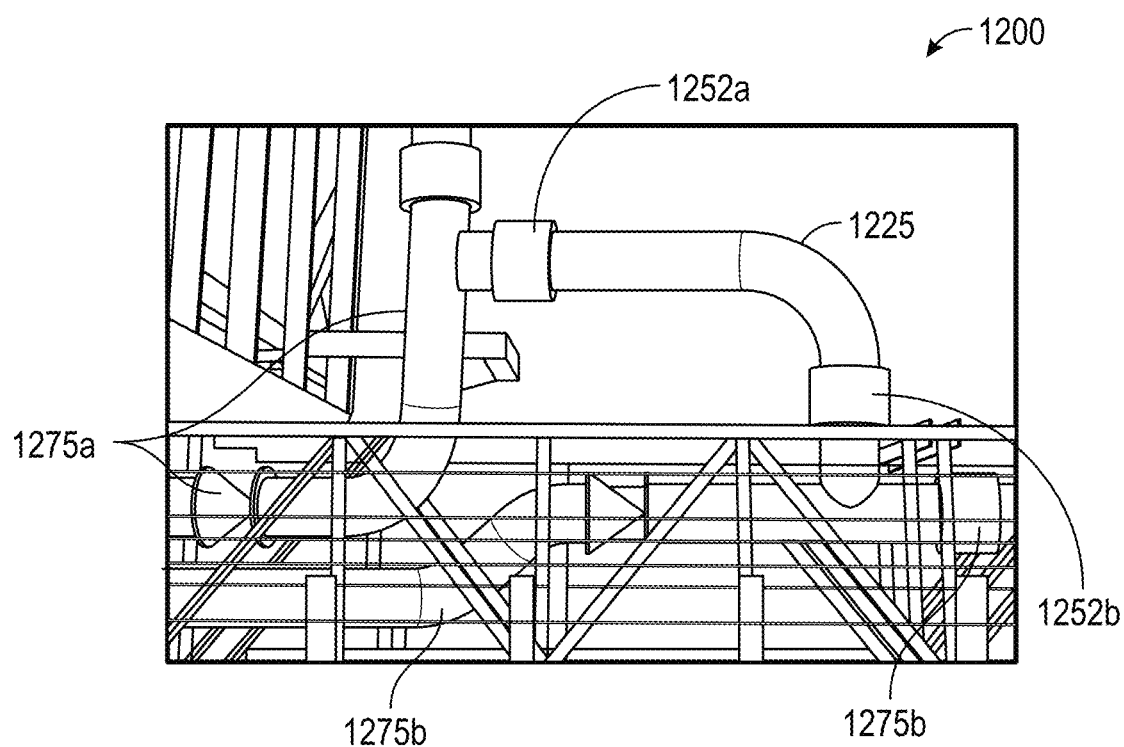
FIG. 12 shows a header arrangement of a cooling tower system for treating cooling water in industrial production facilities, configured in accordance with embodiments of the present technology.

FIG. 12 shows a header arrangement 1200 of a cooling tower system (e.g., the cooling tower systems 400, 500 of FIGS. 4 and 5) for treating cooling water in production facilities, configured in accordance with embodiments of the present technology. The header arrangement 1200 includes outlet lines 1275a, 1275b (collectively referred to as "outlet lines 1275"). The header arrangement 1200 can further include valves 1252a, 1252b (collectively referred to as "valves 1252") and a coupling tube 1225. The coupling tube 1225 can fluidically couple the outlet lines 1275 to one another such that supply water in the outlet lines 1275 can be directed to either one or both of the outlet lines 1275. As described in more detail with reference to FIGS. 1-3, the industrial production facility can include more than one GPI unit. The header arrangement 1200 can ensure that any one of the GPI units can receive supply water from the cooling tower systems described herein. More specifically, the valves 1252 can control the flow of fluid between the outlet lines 1275 by redirecting fluid between the outlet lines 1275 via the coupling tube 1225. This configuration enables any number of outlet pumps (e.g., the supply water pumps 570, 870 of FIGS. 5 and 8) and the outlet lines 1275 to be used to direct supply water to either of the GPI units. In some embodiments, a controller (e.g., the controller 402 of FIG. 4) can control the flow of the supply water between the outlet lines 1275.

Figure 13:
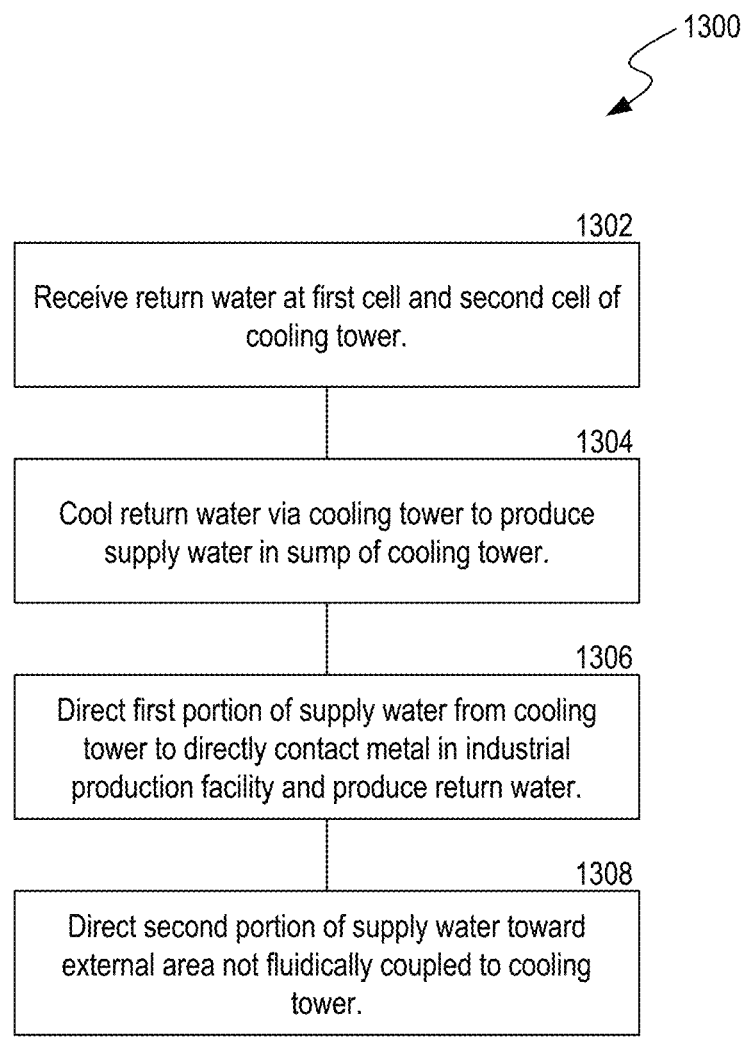
FIG. 13 is a flow diagram of a method for treating cooling water in an industrial production facility, in accordance with embodiments of the present technology.

FIG. 13 is a flow diagram of a method 1300 for treating cooling water in an industrial production facility, in accordance with embodiments of the present technology. The method 1300 can generally be directed to the treatment of cooling water from the system 100 of FIGS. 1-3. One or both of the cooling tower systems 400, 500 of FIGS. 4 and 5 can be operated according to the process portions described herein. In some embodiments, a return water is received at a first cell and a second cell (collectively referred to as "the cells") of the cooling tower (process portion 1302). For example, the first cell and the second cell can be the cells 560a, 560b of FIG. 5 and the cooling tower can be the cooling tower 555 of FIG. 5. The flow rate of the return water received at the cooling tower is described in more detail with reference to FIG. 4.

A valve arrangement can direct the return water to the cells of the cooling tower and/or isolate the return water from one or both of the cells. The cooling tower can also include additional cells, such as a third cell adjacent to the second cell, a fourth cell adjacent to the third cell, and a fifth cell adjacent to the fourth cell. Similarly, the valve arrangement can be configured such that the return water can be isolated at one or more of these additional cells. In some embodiments, before the return water is directed to the cells of the cooling tanks, the return water can be directed to a supplemental water treatment system. The supplemental water treatment system is described in more detail with reference to FIG. 5.

The cooling tower can cool the return water to produce a supply water in a sump of the cooling tower (process portion 1304). For example, each of the cells can include a sump (e.g., the sump 464 of FIG. 4) that can maintain a level of the supply water as the return water is cooled, for example by directed air into the cooling tank via a fan (e.g., the fan 459 of FIG. 4). In some embodiments, settled solids from the supply water are collected in a basin (e.g., the basin 777 of FIG. 7) below the sump of each cell. In some embodiments, the basin includes a gate that can be opened and/or closed to direct the supply water from an individual cell into a trough (e.g., the trough 778 of FIG. 7) below the basin. The trough can be configured to direct a portion of the supply water back to the industrial production facility, as described in more detail with reference to FIG. 7 and elsewhere herein.

In some embodiments, a first portion of the supply water from the cooling tower is directed to contact metal in the industrial production facility, producing the return water (process portion 1306). This first portion of the supply water is directed to the industrial production facility (e.g., to the GPI facility equipment 405, 505 of FIGS. 4 and 5) via an outlet line (e.g., the outlet lines 475, 575 of FIGS. 4 and 5). The flow rate of the supply water directed to the industrial production facility is described in more detail with reference to FIG. 4.

The valve arrangement described above can further be configured to direct the supply water from the cells of the cooling tower to the industrial production facility. The valve arrangement can isolate each cell such that a first portion of the supply water from each cell (i.e., from the sump of the cell) can be controllably directed to the industrial production facility. Additionally or alternatively, the valve arrangement can be configured to direct a second portion of the supply water to an external system away from the cooling tower, as described in more detail with reference to process portion 1308.

The return water can be the supply water that has been in contact with the industrial. In some embodiments, the return water is collected at one or more components and/or portions of the industrial production facility (e.g., the granulator units, the classifier, etc.), as described in more detail with reference to FIGS. 1-5. The return water can be configured to include particles with sizes less than 20 microns, as described in more detail with reference to FIGS. 4 and 5. Additionally or alternatively, the return water can be collected in a collection tank before being returned to the cooling tower, as described in more detail with reference to FIGS. 5 and 6.

In some embodiments, the industrial production facility is an iron production facility that produces GI via a granulator, with the first portion of the supply water directly contacting the GI (e.g., via the granulator units 130 of FIG. 1). Additionally or alternatively, the industrial production facility can be a GMU production facility, a GS production facility, and/or a GPI production facility, as described in more detail with reference to FIGS. 4 and 5. In each production facility, the first portion of the supply water can directly contact the respective product (e.g., the GMU, GS, GPI, etc.), for example, during a granulation process to cool a molten metal into the respective granulated products.

A second portion of the supply water can be directed toward an external system not fluidically coupled to the cooling tower (process portion 1308). For example, the external system can include a ditch and/or a lake generally near the industrial production facility and/or the cooling tower system. The second portion of the supply water can also be directed to a blowdown treatment system that includes a flocculant supply, where a flocculant such as polyacrylamide, polyethylene oxide, aluminum sulfate, ferric chloride, or polydiallyldimethylammonium chloride is introduced into the supply water. To maintain the water levels in the cooling tower system, makeup water can be introduced into the cooling tower, as described in more detail with reference to FIG. 4. The flow rates of the second portion of the supply water and/or makeup water are described in more detail with reference to FIGS. 4 and 5.

From the foregoing, it will be appreciated that, although specific embodiments of the technology have been described herein for purposes of illustration, various modifications can be made without deviating from the spirit and scope of the technology. Further, certain aspects of the new technology described in the context of particular embodiments can be combined or eliminated in other embodiments. Moreover, while advantages associated with certain embodiments of the technology have been described in the context of those embodiments, other embodiments can also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

IV. Conclusion

It will be apparent to those having skill in the art that changes may be made to the details of the above-described embodiments without departing from the underlying principles of the present disclosure. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Additionally, the term "comprising," "including," and "having" should be interpreted to mean including at least the recited feature(s) such that any greater number of the same feature and/or additional types of other features are not precluded.

Reference herein to "one embodiment," "an embodiment," "some embodiments," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing numerical values used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10. All ranges defined by the term "between" are inclusive of the endpoint values of the ranges. For example, a range "between 1 and 10" includes the minimum value of 1, the maximum value of 10, and any values therein between.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims. As used herein, the term "and/or," as in "A and/or B" refers to A alone, B alone, or both A and B.

The present technology is illustrated, for example, according to various aspects described below as numbered clauses (1, 2, 3, etc.) for convenience. These are provided as examples and do not limit the present technology. It is noted that any of the dependent clauses may be combined in any combination, and placed into a respective independent clause. The other clauses can be presented in a similar manner.

1. A system for treating cooling water in an industrial production facility, the system comprising:
   a cooling tower including a first cell and a second cell, each of the first and second cells including:
      a housing positioned to receive a return water, and
      a sump below the housing and configured to maintain a level of a supply water configured to be in direct contact with molten metal from the industrial production facility;
   an inlet comprising an inlet line positioned to provide the return water to the cooling tower;
   an outlet comprising an outlet line positioned to direct the supply water toward the industrial production facility, wherein the inlet, the outlet, and the cooling tower comprise a closed-loop network; and
   a blowdown line fluidically coupled to the outlet and configured to direct a portion of the supply water away from the closed-loop network.

2. The system of any one of the clauses herein, wherein the blowdown line directs the portion of the supply water to an external system not fluidically coupled to the cooling tower.

3. The system of any one of the clauses herein, wherein the portion of the supply water is received at a ditch and/or a lake that is not fluidically coupled to the cooling tower.

4. The system of any one of the clauses herein, further comprising a blowdown treatment system fluidically coupled to the blowdown line and including a flocculant supply configured to introduce a flocculant into the portion of the supply water.

5. The system of any one of the clauses herein, wherein the flocculant is at least one a polyacrylamide, polyethylene oxide, aluminum sulfate, ferric chloride, or polydiallyldimethylammonium chloride.

6. The system of any one of the clauses herein, further comprising a makeup line positioned to direct a makeup water toward the sump.

7. The system of any one of the clauses herein, further comprising a cooling tower water treatment system fluidically coupled to a makeup line and including a dispersant supply configured to introduce a dispersant into a makeup water.

8. The system of any one of the clauses herein, wherein the dispersant is at least one a sodium polyacrylate, sodium hexametaphosphate, polyphosphates, lignosulfonates, polycarboxylates, polyacrylic acid, naphthalene sulfonate formaldehyde condensates, polyethylene glycol, alkylbenzene sulfonates, or polyvinyl alcohol.

9. The system of any one of the clauses herein, further comprising a supplemental water treatment system configured to treat the return water with at least one of (i) a full flow lamella clarification or (ii) a side stream lamella clarification.

10. The system of any one of the clauses herein, wherein return water from the industrial production facility is combined in a collection tank, and wherein the inlet line is positioned to provide the return water from the collection tank to the cooling tower.

11. The system of any one of the clauses herein, wherein the return water is configured to include particles having a particle size less than 20 microns.

12. The system of any one of the clauses herein, wherein the return water is configured to include particles having a particle size less than 0.1 micron, 1 micron, 5 microns, 10 microns, 15 microns, or 20 microns.

13. The system of any one of the clauses herein, wherein the return water is configured to include particles having a particle size between 0.1 micron and 20 microns.

14. The system of any one of the clauses herein, wherein the return water is configured to include between 0.5% and 20% suspended solids less than 1 micron.

15. The system of any one of the clauses herein, wherein the return water is configured to include between 20% and 40% suspended solids ranging from 1 to 10 microns.

16. The system of any one of the clauses herein, wherein the return water is configured to include between 40% and 80% suspended solids ranging from 10 to 60 microns.

17. The system of any one of the clauses herein, wherein the return water is configured to include between 25% and 40% suspended solids ranging from 60 to 200 microns.

18. The system of any one of the clauses herein, wherein the return water is configured to include suspended solids between 500 ppm and 1000 ppm.

19. The system of any one of the clauses herein, wherein the return water is configured to include suspended solid with settling spans between 8 days and 750 days.

20. The system of any one of the clauses herein, wherein the return water is configured to include suspended solid with settling spans between 1 year and 5 years.

21. The system of any one of the clauses herein, wherein the temperature of the molten metal from the industrial production facility immediately prior to contacting the molten metal is at least 1050° C., 1100° C., 1150° C., 1200° C., 1250° C., 1300° C., 1350° C., 1400° C., 1450° C., or 1500° C.

22. The system of any one of the clauses herein, wherein the temperature of the molten metal from the industrial production facility is between 1050° C. and 1500° C.

23. The system of any one of the clauses herein, wherein the industrial production facility is configured to produce granulated metal via a granulator, and wherein the supply water of the outlet line directly contacts the granulated metal.

24. The system of any one of the clauses herein, wherein the blowdown line is positioned between the granulator and the cooling tower.

25. The system of any one of the clauses herein, wherein the industrial production facility is an iron production facility, and the supply water of the outlet line directly contacts a molten iron.

26. The system of any one of the clauses herein, wherein the industrial production facility is a steel production facility, and the supply water of the outlet line directly contacts a molten steel.

27. The system of any one of the clauses herein, wherein the industrial production facility is a Granulated Metallic Unit (GMU) production facility, and the supply water of the outlet line directly contacts the GMU, wherein the GMU comprises a mass fraction of carbon that is less than 4.0 wt. %.

28. The system of any one of the clauses herein, wherein the industrial production facility is a Granulated Steel (GS)

production facility, and the supply water of the outlet line directly contacts the GS, wherein the GS comprises a mass fraction of carbon that is less than 1.0 wt. %.

29. The system of any one of the clauses herein, wherein the industrial production facility is a Granulated Pig Iron (GPI) production facility, and the supply water of the outlet line directly contacts the GPI, wherein the GPI comprises a mass fraction of carbon that is at least 4.0 wt. %.

30. The system of any one of the clauses herein, further comprising a valve arrangement configured to isolate the return water and/or the supply water from the first cell.

31. The system of any one of the clauses herein, wherein the valve arrangement is a first valve arrangement, the system further comprising a second valve arrangement configured to isolate the return water and/or the supply water from the second cell.

32. The system of any one of the clauses herein, wherein each of the first and second cells further includes a basin below the sump and configured to collect settled solids from the supply water.

33. The system of any one of the clauses herein, wherein the cooling tower further comprises a third cell adjacent the second cell, a fourth cell adjacent the third cell, and a fifth cell adjacent the fourth cell.

34. The system of any one of the clauses herein, further comprising a basin including a first region associated with the first cell and a second region associated with the second cell.

35. The system of any one of the clauses herein, wherein the housing and/or the sump of the cooling tower define a perimeter, the cooling tower further comprising a basin including a first region associated with the first cell and a second region associated with the second cell, wherein the first region and/or the second region extends beyond the perimeter.

36. The system of any one of the clauses herein, wherein the first region and/or the second region extend beyond the perimeter at an angle of at most −10 degrees relative to a dimension of the perimeter.

37. The system of any one of the clauses herein, wherein the first region and/or the second region extend beyond the perimeter at an angle of at least −40 degrees, −30 degrees, −20 degrees, or −10 degrees relative to a dimension of the perimeter.

38. The system of any one of the clauses herein, wherein the first region and/or the second region extend beyond the perimeter at an angle between −40 degrees and −10 degrees relative to a dimension of the perimeter.

39. The system of any one of the clauses herein, wherein the basin further includes a weir having a gate that can be opened and/or closed, and wherein opening the gate directs the supply water from an individual one of the first and the second cells into a trough.

40. The system of any one of the clauses herein, wherein the gates of the first and second cells can be selectively opened and/or closed independently of one another.

41. The system of any one of the clauses herein, further comprising a trough below the sump of the cooling tower and extending across a length of the cooling tower including the first cell and the second cell.

42. The system of any one of the clauses herein, wherein the blowdown line is configured to direct a flow rate of at least 1,000 gallons per minute of the supply water away from the closed-loop network.

43. The system of any one of the clauses herein, wherein the blowdown line is configured to direct a flow rate of at least 1,000, 2,000, 3,000, 4,000, 5,000, 6,000, 7,000, 8,000, 9,000, 10,000, 11,000, or 12,000 gallons per minute of the supply water away from the closed-loop network.

44. The system of any one of the clauses herein, wherein the blowdown line is configured to direct a flow rate between 1,000 and 12,000 gallons per minute of the supply water away from the closed-loop network.

45. The system of any one of the clauses herein, wherein the industrial production facility uses at least 10,000 gallons per minute of the supply water.

46. The system of any one of the clauses herein, wherein the industrial production facility uses at least 10,000, 20,000, 30,000, 40,000, or 50,000 gallons per minute of the supply water.

47. The system of any one of the clauses herein, wherein the industrial production facility uses between 10,000 and 50,000 gallons per minute of the supply water.

48. The system of any one of the clauses herein wherein the industrial production facility produces at least 10,000 gallons per minute of the return water.

49. The system of any one of the clauses herein, wherein the industrial production facility produces at least 10,000, 20,000, 30,000, 40,000, or 50,000 gallons per minute of the return water.

50. The system of any one of the clauses herein, wherein the industrial production facility produces between 10,000 and 50,000 gallons per minute of the return water.

51. The system of any one of the clauses herein, wherein the supply water within the closed-loop network is turned over at most every 500 minutes.

52. The system of any one of the clauses herein, wherein the supply water within the closed-loop network is turned over at most every 100, 200, 300, 400, or 500 minutes.

53. The system of any one of the clauses herein, wherein the supply water within the closed-loop network is turned over between every 100 and 500 minutes.

54. The system of any one of the clauses herein, wherein the portion of the supply water within the blowdown line relative to the supply water within the closed-loop network corresponds to a cycle of at most 4.

55. The system of any one of the clauses herein, wherein the cycle represents a ratio of a first concentration of dissolved solids in the supply water of the closed-loop network relative to a second concentration of dissolved solids in the portion of the supply water within the blowdown line.

56. The system of any one of the clauses herein, further comprising a makeup line positioned to direct a makeup water from a cooling water treatment system toward the sump at a flow rate of at least 1,000 gallons per minute.

57. The system of any one of the clauses herein, further comprising a makeup line positioned to direct a makeup water from a cooling water treatment system toward the sump at a flow rate of at least 1,000, 2,000, 3,000, 4,000, 5,000, 6,000, 7,000, 8,000, 9,000, 10,000, 11,000, or 12,000 gallons per minute.

58. The system of any one of the clauses herein, further comprising a makeup line positioned to direct a makeup water from a cooling water treatment system toward the sump at a flow rate between 1,000 and 12,000 gallons per minute.

59. The system of any one of the clauses herein, wherein the industrial production facility produces at least 10 tons of metal per hour.

60. The system of any one of the clauses herein, wherein the industrial production facility produces at least 10, 50, 100, 200, 400, 1000, or 2000 tons of metal per hour.

61. The system of any one of the clauses herein, wherein the industrial production facility produces between 10 and 2000 tons of metal per hour.

62. The system of any one of the clauses herein, wherein the industrial production facility produces at least 750 tons of metal per day.

63. The system of any one of the clauses herein, wherein the industrial production facility produces at least 750, 1000, 3000, 7500, 20000, 30000, or 40000 tons of metal per day.

64. The system of any one of the clauses herein, wherein the industrial production facility produces between 750 and 40000 tons of metal per day.

65. The system of any one of the clauses herein, wherein a ratio of the portion of the supply water directed away from the closed-loop network to metal produced in the industrial production facility is at least 100 gallons per ton of metal produced.

66. The system of any one of the clauses herein, wherein a ratio of the portion of the supply water directed away from the closed-loop network to metal produced in the industrial production facility is at least 100, 250, 750, 1250, 3000, or 5000 gallons per ton of metal produced.

67. The system of any one of the clauses herein, wherein a ratio of the portion of the supply water directed away from the closed-loop network to metal produced in the industrial production facility is between 100 and 5000 gallons per ton of metal produced.

68. The system of any one of the clauses herein, wherein a ratio of the supply water used in the industrial production facility to metal produced in the industrial production facility is at least 100 gallons per ton of metal produced.

69. The system of any one of the clauses herein, wherein a ratio of the supply water used in the industrial production facility to metal produced in the industrial production facility is at least 100, 250, 750, 1250, 3000, or 5000 gallons per ton of metal produced.

70. The system of any one of the clauses herein, wherein a ratio of the supply water used in the industrial production facility to metal produced in the industrial production facility is between 100 and 5000 gallons per ton of metal produced.

71. A method for treating cooling water in an industrial production facility, the method comprising:
receiving a return water at a first cell and a second cell of a cooling tower;
cooling the return water via the cooling tower to produce a supply water in a sump of the cooling tower;
directing a first portion of the supply water from the cooling tower to directly contact metal in the industrial production facility and produce the return water; and
directing a second portion of the supply water toward an external area not fluidically coupled to the cooling tower.

72. The method of any one of the clauses herein, wherein the return water produced is configured to include particles having a particle size less than 20 microns.

73. The method of any one of the clauses herein, wherein the return water produced is configured to include particles having a particle size less than 0.1 micron, 1 micron, 5 microns, 10 microns, 15 microns, or 20 microns.

74. The method of any one of the clauses herein, wherein the return water produced is configured to include particles having a particle size between 0.1 micron and 20 microns.

75. The method of any one of the clauses herein, wherein the return water produced is configured to include between 0.5% and 20% suspended solids less than 1 micron.

76. The method of any one of the clauses herein, wherein the return water produced is configured to include between 20% and 40% suspended solids ranging from 1 to 10 microns.

77. The method of any one of the clauses herein, wherein the return water produced is configured to include between 40% and 80% suspended solids ranging from 10 to 60 microns.

78. The method of any one of the clauses herein, wherein the return water produced is configured to include between 25% and 40% suspended solids ranging from 60 to 200 microns.

79. The method of any one of the clauses herein, wherein the return water produced is configured to include suspended solids between 500 ppm and 1000 ppm.

80. The method of any one of the clauses herein, wherein the return water produced is configured to include suspended solid with settling spans between 8 days and 750 days.

81. The method of any one of the clauses herein, wherein the return water produced is configured to include suspended solid with settling spans between 1 year and 5 years.

82. The method of any one of the clauses herein, further comprising isolating the return water and/or the supply water from the first cell of the cooling tower via a valve arrangement.

83. The method of any one of the clauses herein, wherein the valve arrangement is a first valve arrangement, and further comprising isolating the return water and/or the supply water from the second cell of the cooling tower via a second valve arrangement.

84. The method of any one of the clauses herein, further comprising directing the second portion of the supply water to a at a ditch and/or a lake that is not fluidically coupled to the cooling tower.

85. The method of any one of the clauses herein, further comprising:
directing the second portion of the supply water to a blowdown treatment system including a flocculant supply; and
introducing a flocculant into the second portion of the supply water.

86. The method of any one of the clauses herein, wherein the flocculant is at least one a polyacrylamide, polyethylene oxide, aluminum sulfate, ferric chloride, or polydiallyldimethylammonium chloride.

87. The method of any one of the clauses herein, further comprising introducing a makeup water into the cooling tower.

88. The method of any one of the clauses herein, further comprising:
introducing a dispersant into a makeup water; and
directing the makeup water into the cooling tower.

89. The method of any one of the clauses herein, wherein the dispersant is at least one a sodium polyacrylate, sodium hexametaphosphate, polyphosphates, lignosulfonates, polycarboxylates, polyacrylic acid, naphthalene sulfonate formaldehyde condensates, polyethylene glycol, alkylbenzene sulfonates, or polyvinyl alcohol.

90. The method of any one of the clauses herein, further comprising:
directing the return water to a supplemental water treatment system; and
introducing at least one of (i) a full flow lamella clarification or (ii) a side stream lamella clarification into the return water.

91. The method of any one of the clauses herein, further comprising collecting the return water in a collection tank.

92. The method of any one of the clauses herein, wherein the industrial production facility is configured to produce granulated metal via a granulator, further comprising directing the first portion of the supply water to directly contact the granulated metal.

93. The method of any one of the clauses herein, wherein the industrial production facility is an iron production facility, further comprising directing the first portion of the supply water to directly contact a molten iron.

94. The method of any one of the clauses herein, wherein the industrial production facility is a steel production facility, further comprising directing the first portion of the supply water to directly contact a molten steel.

95. The method of any one of the clauses herein, wherein the industrial production facility is a Granulated Metallic Unit (GMU) production facility, and the GMU comprises a mass fraction of carbon that is less than 4.0 wt. %, further comprising directing the first portion of the supply water to directly contact the GMU.

96. The method of any one of the clauses herein, wherein the industrial production facility is a Granulated Steel (GS) production facility, and the GS comprises a mass fraction of carbon that is less than 1.0 wt. %, further comprising directing the first portion of the supply water to directly contact the GS.

97. The method of any one of the clauses herein, wherein the industrial production facility is a Granulated Pig Iron (GPI) production facility, and the GPI comprises a mass fraction of carbon that is at least 4.0 wt. %, further comprising directing the first portion of the supply water to directly contact the GPI.

98. The method of any one of the clauses herein, further comprising cooling the return water in a third cell adjacent to the second cell, a fourth cell adjacent to the third cell, and a fifth cell adjacent to the fourth cell of the cooling tower.

99. The method of any one of the clauses herein, further comprising collecting settled solids from the supply water in a basin below the sump of each of the first and second cells.

100. The method of any one of the clauses herein, wherein the basin includes a first region associated with the first cell and a second region associated with the second cell.

101. The method of any one of the clauses herein, further comprising opening a gate in the basin to direct the supply water from an individual one of the first and second cells into a trough.

102. The method of any one of the clauses herein, further comprising directing the supply water through a trough.

103. The method of any one of the clauses herein, further comprising:
measuring a flow rate of the second portion of the supply water; and
introducing a makeup water into the cooling tower at a flow rate equivalent to the flow rate measured.

104. The method of any one of the clauses herein, wherein the second portion of the supply water is directed toward the external area at a flow rate of at least 1,000 gallons per minute.

105. The method of any one of the clauses herein, wherein the second portion of the supply water is directed toward the external area at a flow rate of at least 1,000, 2,000, 3,000, 4,000, 5,000, 6,000, 7,000, 8,000, 9,000, 10,000, 11,000, or 12,000 gallons per minute.

106. The method of any one of the clauses herein, wherein the second portion of the supply water is directed toward the external area at a flow rate between 1,000 and 12,000 gallons per minute.

107. The method of any one of the clauses herein, wherein the first portion of the supply water is directed to the industrial production facility at a flow rate of at least 10,000 gallons per minute.

108. The method of any one of the clauses herein, wherein the first portion of the supply water is directed to the industrial production facility at a flow rate of at least 10,000, 20,000, 30,000, 40,000, or 50,000 gallons per minute.

109. The method of any one of the clauses herein, wherein the first portion of the supply water is directed to the industrial production facility at a flow rate between 10,000 and 50,000 gallons per minute.

110. The method of any one of the clauses herein, wherein the return water is received at a flow rate of at least 10,000 gallons per minute.

111. The method of any one of the clauses herein, wherein the return water is received at a flow rate of at least 10,000, 20,000, 30,000, 40,000, or 50,000 gallons per minute.

112. The method of any one of the clauses herein, wherein the return water is received at a flow rate between 10,000 and 50,000 gallons per minute.

113. The method of any one of the clauses herein, further comprising turning over the first portion of the supply water at most every 500 minutes.

114. The method of any one of the clauses herein, further comprising turning over the first portion of the supply water at most every 100, 200, 300, 400, or 500 minutes.

115. The method of any one of the clauses herein, further comprising turning over the first portion of the supply water between every 100 and 500 minutes.

116. The method of any one of the clauses herein, wherein the second portion of the supply water relative to the first portion of the supply water corresponds to a cycle of at most 4.

117. The method of any one of the clauses herein, wherein the cycle represents a ratio of a first concentration of dissolved solids in the first portion of the supply water relative to a second concentration of dissolved solids in the second portion of the supply water.

118. The method of any one of the clauses herein, further comprising directing a makeup water from a cooling water treatment system toward the cooling tower at a flow rate of at least 1,000 gallons per minute.

119. The method of any one of the clauses herein, further comprising directing a makeup water from a cooling water treatment system toward the cooling tower at a flow rate of at least 1,000, 2,000, 3,000, 4,000, 5,000, 6,000, 7,000, 8,000, 9,000, 10,000, 11,000, or 12,000 gallons per minute.

120. The method of any one of the clauses herein, further comprising directing a makeup water from a cooling water treatment system toward the cooling tower at a flow rate between 1,000 and 12,000 gallons per minute.

121. The method of any one of the clauses herein, wherein the industrial production facility produces at least 10 tons of metal per hour.

122. The method of any one of the clauses herein, wherein the industrial production facility produces at least 10, 50, 100, 200, 400, 1000, or 2000 tons of metal per hour.

123. The method of any one of the clauses herein, wherein the industrial production facility produces between 10 and 2000 tons of metal per hour.

124. The method of any one of the clauses herein, wherein the industrial production facility produces at least 750 tons of metal per day.

125. The method of any one of the clauses herein, wherein the industrial production facility produces at least 750, 1000, 3000, 7500, 20000, 30000, or 40000 tons of metal per day.

126. The method of any one of the clauses herein, wherein the industrial production facility produces between 750 and 40000 tons of metal per day.

127. The method of any one of the clauses herein, wherein a ratio of the second portion of the supply water to metal produced in the industrial production facility is at least 100 gallons per ton of metal produced.

128. The method of any one of the clauses herein, wherein a ratio of the second portion of the supply water to metal produced in the industrial production facility is at least 100, 250, 750, 1250, 3000, or 5000 gallons per ton of metal produced.

129. The method of any one of the clauses herein, wherein a ratio of the second portion of the supply water to metal produced in the industrial production facility is between 100 and 5000 gallons per ton of metal produced.

130. The method of any one of the clauses herein, wherein a ratio of the first portion of the supply water to metal produced in the industrial production facility is at least 100 gallons per ton of metal produced.

131. The method of any one of the clauses herein, wherein a ratio of the first portion of the supply water to metal produced in the industrial production facility is at least 100, 250, 750, 1250, 3000, or 5000 gallons per ton of metal produced.

132. The method of any one of the clauses herein, wherein a ratio of the first portion of the supply water to metal produced in the industrial production facility is between 100 and 5000 gallons per ton of metal produced.

133. A system for treating cooling water in an iron production facility, the system comprising:
a cooling tower including a first cell and a second cell, each of the first and second cells including:
a housing positioned to receive a return water, and
a sump below the housing and configured to maintain a level of a supply water configured to be in direct contact with molten iron;
an inlet comprising an inlet line positioned to provide the return water to the cooling tower;
an outlet comprising an outlet line positioned to direct the supply water toward the iron production facility, wherein the inlet, the outlet, and the cooling tower comprise a closed-loop network;
a blowdown line fluidically coupled to the outlet and configured to direct a portion of the supply water away from the closed-loop network; and
a controller configured to monitor the closed-loop network.

134. A system for treating cooling water in an iron production facility, the system comprising:
a cooling tower including a first cell and a second cell, each of the first and second cells including:
a housing positioned to receive a process water configured to be in direct contact with molten iron from the iron production facility, and
a sump below the housing and configured to maintain a level of the process water;
an inlet comprising an inlet line positioned to provide the process water to the cooling tower;
an outlet comprising an outlet line positioned to direct the process water toward the iron production facility, wherein the inlet, the outlet, and the cooling tower comprise a closed-loop network; and
a blowdown line fluidically coupled to the outlet and configured to direct a portion of the process water away from the closed-loop network.

What is claimed is:

1. A system for treating cooling water in an industrial production facility, the system comprising:
a cooling tower including a first cell and a second cell, each of the first and second cells including:
a housing positioned to receive a return water, and
a sump below the housing and configured to maintain a level of a supply water, wherein, in operation, (i) the supply water is in direct contact with molten metal from the industrial production facility, and (ii) the molten metal has a temperature of at least 1050° C. prior to contacting the supply water;
an inlet comprising an inlet line positioned to provide the return water to the cooling tower;
an outlet comprising an outlet line positioned to direct the supply water toward the industrial production facility, wherein the inlet, the outlet, and the cooling tower form a loop; and
a blowdown line fluidically coupled to the outlet and configured to direct a portion of the supply water away from the loop at a flow rate between 1,000 and 12,000 gallons per minute,
wherein the cooling tower is configured to operate for at least 12 hours continuously.

2. The system of claim 1, wherein the return water is configured to include particles having a particle size between 0.1 micron and 20 microns.

3. The system of claim 1, wherein the industrial production facility is configured to produce granulated metal via a granulator, and wherein the supply water of the outlet line directly contacts the granulated metal.

4. The system of claim 1, further comprising a valve arrangement configured to isolate the return water and/or the supply water from the first cell.

5. The system of claim 4, wherein the valve arrangement is a first valve arrangement, the system further comprising a second valve arrangement configured to isolate the return water and/or the supply water from the second cell.

6. The system of claim 1, wherein the blowdown line is configured to direct the portion of the supply water to an external system not fluidically coupled to the cooling tower.

7. The system of claim 1, further comprising a blowdown treatment system fluidically coupled to the blowdown line and including a flocculant supply configured to introduce a flocculant into the portion of the supply water.

8. The system of claim 1, further comprising a cooling tower water treatment system fluidically coupled to a makeup line and including a dispersant supply configured to introduce a dispersant into a makeup water.

9. The system of claim 1, wherein the cooling tower further comprises a third cell adjacent the second cell, a fourth cell adjacent the third cell, and a fifth cell adjacent the fourth cell.

10. The system of claim 1, wherein each of the first and second cells further includes a basin below the sump and configured to collect settled solids from the supply water.

11. A system for treating cooling water in an industrial production facility, the system comprising:
a cooling tower including a basin, a first cell, and a second cell, each of the first and second cells including:
a housing positioned to receive a return water, and
a sump below the housing and configured to maintain a level of a supply water, wherein, in operation, (i) the supply water is in direct contact with molten metal from the industrial production facility, and (ii) the molten metal has a temperature of at least 1050°

C. prior to contacting the supply water, wherein the housing and/or the sump of the cooling tower define a perimeter,
wherein the basin includes a first region associated with the first cell and a second region associated with the second cell, wherein the first region and/or the second region extends beyond the perimeter;
an inlet comprising an inlet line positioned to provide the return water to the cooling tower;
an outlet comprising an outlet line positioned to direct the supply water toward the industrial production facility, wherein the inlet, the outlet, and the cooling tower form a loop; and
a blowdown line fluidically coupled to the outlet and configured to direct a portion of the supply water away from the loop.

12. A system of for treating cooling water in an industrial production facility, the system comprising:
a cooling tower including a first cell and a second cell, each of the first and second cells including:
a housing positioned to receive a return water, and
a sump below the housing and configured to maintain a level of a supply water, wherein, in operation, (i) the supply water is in direct contact with molten metal from the industrial production facility, and (ii) the molten metal has a temperature of at least 1050° C. prior to contacting the supply water;
a trough below the sump of the cooling tower and extending across a length of the cooling tower including the first cell and the second cell;
an inlet comprising an inlet line positioned to provide the return water to the cooling tower;
an outlet comprising an outlet line positioned to direct the supply water toward the industrial production facility, wherein the inlet, the outlet, and the cooling tower form a loop; and
a blowdown line fluidically coupled to the outlet and configured to direct a portion of the supply water away from the loop.

13. A method for treating cooling water in an industrial production facility, the method comprising:
receiving a return water at a first cell and a second cell of a cooling tower;
cooling the return water via the cooling tower to produce a supply water in a sump of the cooling tower for at least 12 hours continuously;
directing a first portion of the supply water from the cooling tower to directly contact metal in the industrial production facility and produce the return water; and
directing a second portion of the supply water toward an external area not fluidically coupled to the cooling water at a flow rate between 1,000 and 12,000 gallons per minute.

14. The method of claim 13, further comprising:
measuring a flow rate of the second portion of the supply water; and
introducing a makeup water into the cooling tower at a flow rate at least equivalent to the flow rate measured.

15. The method of claim 13, wherein the ratio of the second portion of the supply water to metal produced in the industrial production facility is between 100 and 5000 gallons of supply water per ton of metal produced.

16. The method of claim 13, wherein the ratio of the first portion of the supply water to metal produced in the industrial production facility is between 100 and 5000 gallons of supply water per ton of metal produced.

17. The method of claim 13, further comprising directing a makeup water from a cooling water treatment system toward the cooling tower at a flow rate between 1,000 and 12,000 gallons per minute.

18. A system for treating cooling water in an iron production facility, the system comprising:
a cooling tower including a first cell and a second cell, each of the first and second cells including:
a housing positioned to receive a return water, and
a sump below the housing and configured to maintain a level of a supply water configured to be in direct contact with molten iron;
an inlet comprising an inlet line positioned to provide the return water to the cooling tower;
an outlet comprising an outlet line positioned to direct the supply water toward the iron production facility, wherein the inlet, the outlet, and the cooling tower form a loop;
a blowdown line fluidically coupled to the outlet and configured to direct a portion of the supply water away from the loop at a flow rate between 1,000 and 12,000 gallons per minute; and
a controller configured to monitor the loop,
wherein the cooling tower is configured to operate for at least 12 hours continuously.

19. The system of claim 1, wherein the supply water within the loop is turned over between every 100 and 500 minutes.

20. The system of claim 1, wherein a ratio of (i) the portion of the supply water directed away from the loop to (ii) metal produced in the industrial production facility is at least 100 gallons per ton of metal produced.

* * * * *

UNITED STATES PATENT AND TRADEMARK OFFICE
CERTIFICATE OF CORRECTION

| | | |
|---|---|---|
| PATENT NO. | : 12,370,599 B2 | Page 1 of 1 |
| APPLICATION NO. | : 18/882384 | |
| DATED | : July 29, 2025 | |
| INVENTOR(S) | : John Francis Quanci et al. | |

It is certified that error appears in the above-identified patent and that said Letters Patent is hereby corrected as shown below:

On the Title Page

On Page 2, Column 2, Item (56), (Other Publications), Line 4, delete "Granshot@" and insert --Granshot©-- therefor.

In the Specification

Column 7, Line 56 (Detailed Description), Line 47, delete "handing" and insert --handling-- therefor.

Signed and Sealed this
Thirtieth Day of September, 2025

John A. Squires
*Director of the United States Patent and Trademark Office*